(12) United States Patent  (10) Patent No.: US 6,483,723 B2
Kuranuki et al.  (45) Date of Patent: Nov. 19, 2002

(54) SWITCHING POWER SUPPLY

(75) Inventors: Masaaki Kuranuki, Kyoto (JP); Koji Yoshida, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/003,670

(22) Filed: Nov. 1, 2001

(65) Prior Publication Data

US 2002/0075698 A1 Jun. 20, 2002

(30) Foreign Application Priority Data

Nov. 7, 2000 (JP) ........................................ 2000-338635

(51) Int. Cl.$^7$ ............................................. H02M 3/335
(52) U.S. Cl. ............................. 363/17; 363/98; 363/132
(58) Field of Search ............................. 363/16, 17, 95, 363/98, 131, 132

(56) References Cited

U.S. PATENT DOCUMENTS

| 4,586,118 A | * | 4/1986 | Mihalka | 363/17 |
| 5,065,301 A | * | 11/1991 | Shioya et al. | 363/17 |
| 5,448,467 A | * | 9/1995 | Ferreira et al. | 363/17 |
| 5,781,419 A | * | 7/1998 | Kutkut | 363/17 |
| 5,963,436 A | | 10/1999 | Yoshida | 363/17 |
| 6,304,475 B1 | * | 10/2001 | Iwata et al. | 363/132 |

FOREIGN PATENT DOCUMENTS

| JP | 11-89232 | 3/1999 | .......... H02M/3/335 |
| JP | 2001-8447 | 1/2001 | ............ H02M/3/28 |

* cited by examiner

Primary Examiner—Adolf Deneke Berhane
(74) Attorney, Agent, or Firm—Sheridan Ross P.C.

(57) ABSTRACT

A switching power supply 10 includes snubber capacitors 8Cb and 8Cc connected in parallel with rectifying devices 4b and 4c, respectively, on the secondary side of a transformer 3. A switching control circuit 7 controls the switching of four switching sections 1H, 1L, 2H, and 2L. In particular, the primary current It of the transformer 3 is cut off while the secondary current flowing through a smoothing inductor 5 decreases. Furthermore, when the primary current It of the transformer 3 is cut off, one of the high-side switching section 1H/2H and the low-side switching section 1L/2L that are ON is turned OFF a delay time later than the other. Then, resonance occurs between the equivalent capacitance of the snubber capacitor 8Cb/8Cc and the leak inductance on the secondary side of the transformer 3 with the primary winding 3a short-circuited, and thereby, commutation on the secondary side is quickly achieved. In other words, the equivalent primary current of the transformer 3 is quickly and sufficiently cancelled. Thus, the primary current It is quickly reduced, immediately before the cut-off.

11 Claims, 9 Drawing Sheets

SWITCHING POWER SUPPLY

BACKGROUND OF THE INVENTION

The present invention relates to a switching power supply for supplying a stabilized DC voltage to industrial or consumer electronics equipments.

A power supply for a television set, a VTR, a personal computer, and so on, is required to stably supply a steady DC voltage. A switching power supply is preferable as such a power supply. The switching power supply uses semiconductor devices, e.g. MOSFETs, IGBTs, and thyristors, as switches to once convert an input DC voltage into an AC voltage by repeated cycles of ON/OFF states of the switches. The converted AC voltage is further converted into a steady DC voltage through the sequence of a transformer, a rectifying circuit, and a smoothing circuit, and the steady DC voltage is then output. In the switching power supply, a transfer factor, i.e. the ratio of the output voltage to the input voltage, is substantially determined by the duty factor of the switches. Accordingly, the switching power supply controls the duty factor of the switches by the control over the switches, and thereby stabilizes the output DC voltage.

Since a switching loss, i.e. the power loss caused by switching, is generally small, the switching power supply can supply power at high efficiency. Hence, the switching power supply is excellent for energy saving.

The transfer factor of the switching power supply substantially depends on only the duty factor of the switches, but does not substantially depend on the switching frequency, i.e. the frequency of the turning ON/OFF of the switches. Furthermore, in the switching power supply, when the switching frequency is raised higher, reactive elements, such as transformers, inductors, and capacitors, is miniaturized with the respective performances of the elements preserved. Therefore, the switching power supply is miniaturized with relative ease, maintaining a steady output voltage.

The following is the description of a switching power supply performing hard switching that is an example of a conventional switching power supply. FIG. 6 is the circuit diagram of the conventional switching power supply 100.

In the switching power supply 100, four switching sections 101H, 101L, 102H, and 102L, form a full-bridge on the primary side of a transformer 3. The switching sections 101H and 102H connected to a high-potential input terminal 1a of the full-bridge are referred to as high-side switching sections. The switching sections 101L and 102L connected to a low-potential input terminal 1b of the full-bridge are referred to as low-side switching sections. The four switching sections include respective switching devices 1HS, 1LS, 2HS and 2LS. These switching devices are semiconductor devices, for example, IGBTs. The four switching sections include respective parasitic capacitors 1HC, 1LC, 2HC and 2LC, in parallel with the switching devices. A switching control circuit 70 controls the turning-ON/OFF of the four switching sections.

FIG. 7 is a diagram showing the waveforms of the currents and voltages occurring at various sections of the circuit shown in FIG. 6, according to the hard switching by the switching control circuit 70. In this diagram, positive directions of the currents and voltages at the various sections of the circuit are defined as.

The switching control circuit 70 outputs switching signals G1, G2, G3, and G4 to the switching devices 1HS, 1LS, 2HS, and 2LS, respectively. The switching signals G1, G2, G3, and G4 are rectangular waves. Each switching device is ON during the interval that the switching signal corresponding thereto stays high (H), and OFF during the interval that the switching signal stays low (L).

The switching control circuit 70 performs hard switching for the turning ON/OFF of the four switching sections. Here, hard switching refers to the switching for the simultaneous turning-ON/OFF between one of the high-side switching sections and one of the low-side switching sections. In the hard switching of the switching control circuit 70, the following three periods are sequentially achieved with predetermined time lengths and predetermined cycle periods: (1) A first period corresponds to the period T0–T1 in FIG. 7. During the first period, the first high-side switching section 101H and the second low-side switching section 102L are ON, and the second high-side switching section 102H and the first low-side switching section 101L are OFF. (2) A second period corresponds to the period T2–T3 in FIG. 7. During the second period, the first high-side switching section 101H and the second low-side switching section 102L are OFF, and the second high-side switching section 102H and the first low-side switching section 101L are ON. (3) A third period corresponds to each of the period T1–T2 and the period T3–T4, and is achieved during intervals between the first period and the second period. During the third period, all the four switching sections are OFF.

The following is the description of the hard switching of the switching control circuit 70 in the time sequence from the time T0 to the time T4 shown in FIG. 7.

<Period T0–T1>

At the time T0, the switching control circuit 70 simultaneously changes the first switching signal G1 and the fourth switching signal G4 from L to H, thereby turning ON the first high-side switching section 101H and the second low-side switching section 102L. On the other hand, the first low-side switching section 101L and the second high-side switching section 102H are both OFF.

During the period T0–T1, a substantially steady and positive input voltage Vin is applied across the primary winding 3a of the transformer 3 via the first high-side switching section 101H and the second low-side switching section 102L. Thus, a primary voltage Vt, i.e. the voltage across the primary winding 3a, is substantially equal to the input voltage Vin. Furthermore, the primary current It of the transformer 3 flows from the first junction point P to the second junction point Q of the primary winding 3a. In other words, the primary current It flows in the direction of the arrow shown in FIG. 6. Then, a positive voltage Vin/n is induced across each of the first secondary winding 3b and the second secondary winding 3c of the transformer 3.

Here, the turn ratio of the primary winding 3a, the first secondary winding 3b, and the second secondary winding 3c of the transformer 3 is n:1:1, where n is a positive real number. Since a first rectifying diode 4b is ON, the voltage V5 across a smoothing inductor 5 is substantially equal to Vin/n−Vout. Here, an output voltage Vout, i.e. the voltage across a smoothing capacitor 6, is positive. The output voltage Vout may be assumed to be substantially steady, since the smoothing capacitor 6 has a sufficiently large capacitance. Accordingly, the current I5 flowing through the smoothing inductor 5 increases linearly in the direction of the arrow indicated in FIG. 6 during the period T0–T1. Note that the current I5 increases slowly, since the inductance of the smoothing inductor 5 is sufficiently large. The voltage Vc across a second rectifying diode 4c is substantially equal to +2Vin/n, where the positive direction of the voltage is defined as the direction of the arrow shown in FIG. 6, i.e. the direction of the reverse bias applied to the diode. Accordingly, the second rectifying diode 4c is OFF. Therefore, the current I5 of the smoothing inductor 5 is substantially equal to the current Ib flowing through the first rectifying diode 4b. As a result, during the period T0–T1, the secondary current of the transformer 3 flows only through the first secondary winding 3b, and increases linearly.

The primary current It of the transformer 3 is equal to the sum of the exciting current for the transformer 3 and the equivalent primary current depending on the secondary current of the transformer 3. As shown in FIG. 7, during the period T0–T1, the primary voltage Vt is maintained at the substantially steady value Vin. Accordingly, the exciting current in the primary current It linearly increases in substance. On the other hand, the equivalent primary current increases linearly, since the secondary current of the transformer 3 increases linearly as described above. As a result, the primary current It linearly increases in substance.

<Period T1–T2>

At the time T1, the switching control circuit 70 simultaneously changes the first switching signal G1 and the fourth switching signal G4 from H to L, thereby turning OFF the first high-side switching section 101H and the second low-side switching section 102L. All the four switching sections are thus OFF. Accordingly, the input voltage Vin is not applied across the primary winding 3a of the transformer 3. In other words, the primary voltage Vt of the transformer 3 abruptly drops from the input voltage Vin to zero. Therefore, the respective induced voltages across the secondary windings 3b and 3c of the transformer 3 abruptly change to zero. Then, the voltage Vc across the second rectifying diode 4c abruptly changes to zero, since the first rectifying diode 4b is already ON. Accordingly, the second rectifying diode 4c is abruptly turned ON. As a result, the secondary current of the transformer 3 begins to flow through both of the first secondary winding 3b and the second secondary winding 3c. Thus, at the time T1, commutation occurs on the secondary side of the transformer 3.

During the period T1–T2, no voltage is applied across the primary winding 3a of the transformer 3, and the primary voltage Vt is thereby zero. Thus, no voltage is induced across the secondary windings 3b and 3c of the transformer 3. The voltage V5 across the smoothing inductor 5 is substantially equal to a negative steady voltage –Vout. As a result, the current I5 of the smoothing inductor 5 decreases linearly with a slight inclination.

At the time T1, the primary current It of the transformer 3 abruptly decreases to zero, since all the four switching sections are OFF. Accordingly, during the period T1–T2, the secondary current of the transformer 3 flows through each of the two secondary windings 3b and 3c, wherein one part of the secondary current flowing through the first secondary winding 3b is substantially equal in amount and opposite in direction to the other part flowing through the second secondary winding 3c, so that the equivalent primary current is zero.

<Period T2–T3>

At the time T2, the switching control circuit 70 simultaneously changes the second switching signal G2 and the third switching signal G3 from L to H, thereby turning ON the first low-side switching section 101L and the second high-side switching section 102H. On the other hand, the first high-side switching section 101H and the second low-side switching section 102L are both OFF.

The input voltage Vin is applied across the primary winding 3a of the transformer 3 in the opposite direction to that during the period T0–T1, when the first low-side switching section 101L and the second high-side switching section 102H are ON. In other words, the primary voltage Vt of the transformer 3 abruptly drops from zero to –Vin. Accordingly, the induced voltage across each of the secondary windings 3b and 3c of the transformer 3 abruptly drop from zero to –Vin/n. Then, the second rectifying diode 4c is already ON. Accordingly, the voltage Vb across the first rectifying diode 4b is abruptly raised to +2Vin/n, where the positive direction of the voltage is defined as the direction of the arrow shown in FIG. 6, i.e. the direction of the reverse bias applied to the diode. Thereby, the first rectifying diode 4b is abruptly turned OFF. As a result, the secondary current of the transformer 3 begins to flow only through the second secondary winding 3c. Thus, at the time T2, commutation occurs on the secondary side of the transformer 3.

During the period T2–T3, the first low-side switching section 101L and the second high-side switching section 102H are ON. Accordingly, the primary voltage Vt is substantially equal to –Vin. Furthermore, the primary current It of the transformer 3 flows from the second junction point Q to the first junction point P of the primary winding 3a in the opposite direction to that during the period T0–T1. Then, the voltage across each of the first secondary winding 3b and the second secondary winding 3c is substantially equal to –Vin/n. Since the first rectifying diode is OFF and the second rectifying diode is ON, the voltage V5 across the smoothing inductor 5 is substantially equal to Vc–Vout= Vin/n–Vout. Accordingly, the current I5 flowing through the smoothing inductor 5 linearly increases in the direction of the arrow shown in FIG. 6, in the similar manner to that during the period T0–T1. Since the first rectifying diode 4b is OFF, the current I5 of the smoothing inductor 5 is substantially equal to the current Ic flowing through the second rectifying diode 4c. In other words, during the period T2–T3, the secondary current of the transformer 3 flows only through the second secondary winding 3c and increases linearly.

As shown in FIG. 7, during the period T2–T3, the primary voltage Vt is maintained at the substantially steady value –Vin, in the similar manner to that during the period T0–T1. Accordingly, the exciting current in the primary current It linearly increases in substance. Here, the direction of the primary current It is opposite to that during the period T0–T1. On the other hand, the equivalent primary current increases linearly, since the secondary current of the transformer 3 increases linearly as described above. As a result, the primary current It linearly increases in substance.

<Period T3–T4>

At the time T3, the switching control circuit 70 simultaneously changes the second switching signal G2 and the third switching signal G3 from H to L, thereby turning OFF the first low-side switching section 101L and the second high-side switching section 102H. Since all the four switching sections are thus OFF, the input voltage Vin is not applied across the primary winding 3a of the transformer 3. In other words, the primary voltage Vt of the transformer 3 is abruptly raised from the input voltage –Vin to zero. Therefore, the induced voltage across each of the secondary windings 3b and 3c of the transformer 3 abruptly changes to zero. Then, the voltage Vb across the first rectifying diode 4b abruptly changes to zero, since the second rectifying diode 4c is already ON. Thereby, the first rectifying diode 4b is abruptly turned ON. As a result, the secondary current of the transformer 3 begins to flow through both of the first secondary winding 3b and the second secondary winding 3c, in-the similar manner to that at the time T1. Thus, at the time T3, commutation occurs on the secondary side of the transformer 3.

During the period T3–T4, no voltage is applied across the primary winding 3a of the transformer 3, and the primary voltage Vt is zero. Accordingly, the voltage V5 across the smoothing inductor 5 is substantially equal to the negative steady voltage −Vout. As a result, the current I5 of the smoothing inductor 5 decreases linearly with a slight inclination.

Since all the four switching sections are OFF at the time T3, the primary current It of the transformer 3 abruptly decreases to zero. Accordingly, during the period T3–T4, the secondary current of the transformer 3 flows through each of the two secondary windings 3b and 3c, wherein one part of the secondary current flowing through the first secondary winding 3b is substantially equal in amount and opposite in direction to the other part flowing through the second secondary winding 3c, so that the equivalent primary current is zero, in the similar manner to that during the period T1–T2.

Thus, the state immediately before the time T0 reoccurs in the period T3–T4. After that, the above-described operations during the period T0–T4 are repeated in cycle.

In the hard switching of the switching control circuit 70, the transfer factor, i.e. the ratio of the input voltage Vin to the output voltage Vout, is determined as follows:

Let Ton to be the sum of the time lengths of the first period T0–T1 during which the first high-side switching section 101H is ON, and the second period T2–T3 during which the second high-side switching section 102H is ON. Since the voltage (Vin/n−Vout) is applied across the smoothing inductor 5 during the first and second periods, the magnetic flux to be stored in the smoothing inductor 5 increases by (Vin/n−Vout)×Ton.

On the other hand, let Toff to be the sum of the time lengths of the period T0–T1 and the period T2–T3, during which all the switching sections are OFF. Since the voltage (−Vout) is applied across the smoothing inductor 5 during each period, the magnetic flux to be stored in the smoothing inductor 5 decreases by Vout×Toff.

Accordingly, the reset condition of the smoothing inductor 5, i.e. the condition that the increment and decrement of the magnetic flux are balanced in the smoothing inductor 5, is represented by the following equation (1), $$(Vin/n - Vout) \times Ton = Vout \times Toff. \tag{1}$$

The transfer factor, i.e. the ratio between the input voltage Vin and the output voltage Vout, is obtained from the equation (1) and represented by the following equation (2), $$Vout/Vin = \delta/n,$$

where $$\delta = Ton/(Ton + Toff). \tag{2}$$

As the equation (2) indicates, the control over the duty factor δ for the ON/OFF times of the high-side switching sections stably maintains the output voltage Vout at a substantially steady value.

However, the hard switching of the switching control circuit 70 has the following disadvantages: Each switching section of the full-bridge includes the parasitic capacitor connected in parallel with its switching device as shown in FIG. 6. When all the switching sections are OFF, each parasitic capacitor becomes stable in a charged state. In the hard switching, one high-side switching section and one low-side switching section are simultaneously turned ON.

Accordingly, when each switching section is turned ON, its switching device connected in parallel with the parasitic capacitor is turned ON under the condition that the parasitic capacitor is charged to a certain extent. Then, the parasitic capacitor is short-circuited via the switching device under the ON condition, and the parasitic capacitor discharges abruptly. Thereby, a surge current occurs in the switching section and is converted into heat or an electromagnetic wave. The electric power is dissipated outside through the heat or the electromagnetic wave. Thus, the switching loss, i.e. the power loss caused by the switching, increases. Furthermore, the heat being due to the surge current causes fatigue in the switching section, and the electromagnetic wave produces noise to peripheral circuit devices.

For example, immediately before the time T0 in FIG. 7, the voltage V1H across the first high-side switching section 101H and the voltage V2L across the second low-side switching section 102L are each maintained at finite values. Accordingly, the parasitic capacitor 1HC of the first high-side switching section 101H and the parasitic capacitor 2LC of the second low-side switching section 102L are charged in proportion to the voltages V1H and V2L, respectively. When both the switching sections are turned ON at the time T0, both of the parasitic capacitors 1HC and 2LC discharge abruptly, and surge currents occur. Thereby, the current I1H flowing through the first high-side switching section 101H and the current I2L flowing through the second low-side switching section 102L increase so as to reach steep peaks sc. When the first low-side switching section 101L and the second high-side switching section 102H are simultaneously turned ON at the time T2, the currents I1L and I2H flowing therethrough have similar peaks.

In the hard switching, furthermore, one high-side switching section and one low-side switching section are simultaneously turned OFF. Accordingly, when the switching sections are OFF, the current supplied to the primary winding of the transformer decreases abruptly. Then, resonance occurs between the leak inductance of the primary winding and the parasitic capacitors in the switching sections, thereby causing surge voltages. The occurrence of the surge voltages causes, for example, energy storage and dissipation by the leak inductance of the primary winding. Thus, the switching loss increases.

For example, in FIG. 7, immediately before the time T1 at which the first high-side switching section 101H and the second low-side switching section 102L are turned OFF, the substantially equal currents I1H=I2L flow through the switching sections, respectively. At the time T1 when both the switching sections are turned OFF, intense resonance occurs between the respective parasitic capacitor 1HC and 2LC and the leak inductance of the primary winding 3a of the transformer 3, and then surge voltages occur. Thereby, the voltage V1H across the first high-side switching section 101H and the voltage V2L across the second low-side switching section 102L change to reach steep peaks sv as shown in FIG. 7. Similar peaks appear on the voltage V1L across the first low-side switching section 101L and the voltage V2H across the second high-side switching section 102H at the time T3 when these switching sections are simultaneously turned ON.

As the above-described, in the hard switching, the surge currents/voltages occur each time of the turning-ON/OFF of the switching sections, thereby increasing the switching loss. The increase of the switching loss is undesirable, since it reduces the energy efficiency of the switching power supply. Furthermore, the above-described surge currents/voltages cause electromagnetic waves at the switching frequency and the harmonics thereof. These electromagnetic waves are undesirable, since they hinder the operations of surrounding devices.

In recent years, there is an intensely growing demand for energy-saving and miniaturization of various electronic equipments. That leads to an intense demand for improvements in efficiency, miniaturization, and output stability of switching power supply. The switching frequency must be further raised in order to satisfy such demands. However, the higher the switching frequency is raised, the larger the switching loss increases. Hence, further raising the switching frequency requires a switching technology capable of reducing the switching loss. Soft switching is known as such a switching technology. Here, soft switching means the following switching: (1) causing resonance to occur between the parasitic capacitor in a switch and an external inductor during the transition from ON to OFF or from OFF to ON; (2) switching from ON to OFF or from OFF to ON when the resonance voltage or the resonance current is zero. In particular, switching with the zero voltage across the switch is referred to as zero volt switching (ZVS).

According to the soft switching, no electric power is dissipated in a switch at the time of the turning-ON/OFF. Hence, no switching loss occurs in principle. According to the ZVS, in particular, no charge remains in the parasitic capacitor of the switch at the time of the turning-ON. Therefore, no surge current occurs.

A conventional switching power supply 110 achieving the ZVS is, for example, disclosed in Japanese Laid-open Patent Application No. Hei 11-89232. FIG. 8 shows the circuit diagram of the switching power supply. The same reference signs as those in FIG. 6 designate similar components to those of the conventional example 100 shown in FIG. 6. This switching power supply 110 differs from the above-described conventional example 100 at the following two points: (1) The switching sections 1H, 1L, 2H, and 2L in the full-bridge include diodes 1HD, 1LD, 2HD, and 2LD, respectively, together with the switching devices and the parasitic capacitors. The diodes are connected in parallel with the respective switching devices. The cathode of the diode is thus connected to the high potential side of the switching device, and the anode of the diode is connected with the low potential side of the switching device. When the switching device is a transistor, such as an IGBT, the diode may be the body diode of the transistor.

(2) The switching control circuit 7 performs soft switching for the switching sections in the full-bridge. Hence, the switching loss reduces in comparison with the above-described conventional example 100. The following is the description of the soft switching of the switching control circuit 7.

FIG. 9 is a diagram showing the waveforms of the currents and voltages occurring at various sections of the circuit shown in FIG. 8, according to the soft switching by the switching control circuit 7. In this diagram, the positive directions of the currents and voltages at the various sections of the circuit are defined as the directions of the arrows in FIG. 8.

The switching control circuit 7 outputs switching signals G1, G2, G3, and G4 to the switching devices 1HS, 1LS, 2HS, and 2LS, respectively. The switching signals G1, G2, G3, and G4 are rectangular waves. Each switching device is ON during the interval that the switching signal corresponding thereto stays high (H), and OFF during the interval that the switching signal corresponding thereto stays low (L).

In the soft switching of the switching control circuit 7, the following four periods are sequentially achieved with predetermined time lengths and predetermined cycle periods: (1) A first period corresponds to the period T0–T1 in FIG. 9. During the first period, the first high-side switching section 1H and the second low-side switching section 2L are ON, and the second high-side switching section 2H and the first low-side switching section 1L are OFF. (2) A second period corresponds to the period T4–T5 in FIG. 9. During the second period, the first high-side switching section 1H and the second low-side switching section 2L are OFF, and the second high-side switching section 2H and the first low-side switching section 1L are ON. (3) A third period corresponds to each of the period T2–T3 and the period T6–T7, and is achieved during intervals between the first period and the second period. During the third period, the first high-side switching section 1H and the second high-side switching section 2H are OFF, and the first low-side switching section 1L and the second low-side switching section 2L are ON. (4) A dead time is an infinitesimal period inserted between two of the above-described three periods, and corresponds to each of the periods T1–T2, T3–T4, T5–T6, and T7–T8. During the dead time, either of the pair of the first high-side switching section 1H and the first low-side switching section 1L, or the pair of the second high-side switching section 2H and the second low-side switching section 2L is OFF. In other words, only one of the four switching sections is ON, and three other switching sections are OFF.

The following is the description of the soft switching of the switching control circuit 7 in the time sequence from the time T0 to the time T8 shown in FIG. 9.

<Period T0–T1>

During the period T0–T1, both of the primary current It of the transformer 3 and the current I5 flowing through the smoothing inductor 5 increase linearly, in a similar manner to that during the period T0–T1 of the above-described conventional example. Then, the secondary current of the transformer 3 flows only through the first secondary winding 3b.

<Period T1–T2>

At the time T1, the switching control circuit 7 changes the first switching signal G1 from H to L, thereby turning OFF the first high-side switching section 1H. On the other hand, the second low-side switching section 2L is maintained ON. Then, resonance occurs among the leak inductance of the primary winding 3a, the parasitic capacitor 1HC of the first high-side switching section 1H, and the parasitic capacitor 1LC of the first low-side switching section 1L. Because of the resonance, the primary current It simultaneously causes the parasitic capacitor 1HC of the first high-side switching section 1H to charge, and the parasitic capacitor 1LC of the first low-side switching section 1L to discharge. Accordingly, the voltage V1H across the first high-side switching section 1H is smoothly raised from zero, and the voltage V1L across the first low-side switching section 1L drops smoothly from the maximum value Vin.

Immediately before the time T2, the voltage V1H across the first high-side switching section 1H reaches the maximum value Vin. At the same time, the voltage V1L across the first low-side switching section 1L reaches zero. Then, the diode 1LD of the first low-side switching section 1L is turned ON, thereby clamping the voltage V1L at zero. At the time T2, the switching control circuit 7 changes the second switching signal G2 from L to H, thereby turning ON the first low-side switching section 1L. Thus, ZVS is achieved for the turning-ON of the first low-side switching section 1L.

<Period T2–T3>

During the period T2–T3, the primary winding 3a is short-circuited via the two low-side switching sections 1L and 2L. During this period, the primary voltage Vt is substantially zero. Hence, commutation occurs on the secondary side of the transformer 3, in the similar operation to the above-described operation at the time T1 of the conventional example 100. In other words, the secondary current flows through both of the two secondary windings 3b and 3c, since the two rectifying diodes 4b and 4c are both turned ON. As a result, only a substantially steady voltage (−Vout) is applied to the smoothing inductor 5. Hence, the current I5 flowing through the smoothing inductor 5, and then the secondary current, decreases linearly.

The secondary current flowing through the first secondary winding 3b is larger than that flowing through the second secondary winding 3c during the period T2–T3, in contrast to the above-described conventional example 100, because of the following reasons: Since the voltage Vc across the second rectifying diode 4c drops to zero in the period T1–T2, the second rectifying diode 4c is turned ON at the time T2. However, because of the leak inductance on the secondary side of the transformer 3, the current Ib flowing through the first rectifying diode 4b decreases slowly, and the current Ic flowing through the second rectifying diode 4c increases slowly. Hence, during the period T2–T3, the major portion of the secondary current flows through the first secondary winding 3b, and only the minor remaining portion thereof flows through the second secondary winding 3c. As a result, the equivalent primary current does not decrease very much in the period T2–T3 because of the insufficient cancellation between the secondary windings 3b and 3c, but decreases linearly with a slight inclination by the above-described leak inductance. On the other hand, the exciting current of the primary winding 3a is maintained at a substantially steady value, since the primary voltage Vt is substantially zero. As a result, the primary current It decreases linearly.

<Period T3–T4>

At the time T3, the switching control circuit 7 changes the fourth switching signal G4 from H to L, thereby turning OFF the second low-side switching section 2L. On the other hand, the first low-side switching section 1L is maintained ON. Then, resonance occurs among the leak inductance of the primary winding 3a, the parasitic capacitor 2HC of the second high-side switching section 2H, and the parasitic capacitor 2LC of the second low-side switching section 2L. Because of the resonance, the primary current It simultaneously causes the parasitic capacitor 2HC of the second high-side switching section 2H to discharge, and the parasitic capacitor 2LC of the second low-side switching section 2L to charge. Accordingly, the voltage V2H across the second high-side switching section 2H drops smoothly from the maximum value Vin, and the voltage V2L across the second low-side switching section 2L is smoothly raised from zero.

Immediately before the time T4, the voltage V2L across the second low-side switching section 2L reaches the maximum value Vin. At the same time, the voltage V2H across the second high-side switching section 2H reaches zero. Then, the diode 2HD of the second high-side switching section 2H is turned ON, thereby clamping the voltage V2H at zero. At the time T4, the switching control circuit 7 changes the third switching signal G3 from L to H, thereby turning ON the second high-side switching section 2H. As a result, ZVS is achieved for the turning-ON of the second high-side switching section 2H.

<Period T4–T5>

During the period T4–T5, both of the primary current It of the transformer 3 and the current I5 flowing through the smoothing inductor 5 increase linearly, in the similar manner to that during the second period T2–T3 of the above-described conventional example. However, these currents are opposite in direction to those during the period T0–T1. Furthermore, the secondary current of the transformer 3 flows only through the second secondary winding 3c.

<Period T5–T6>

At the time T5, the switching control circuit 7 changes the third switching signal G3 from H to L, thereby turning OFF the second high-side switching section 2H. On the other hand, the first low-side switching section 1L is maintained ON. Then, resonance occurs among the leak inductance of the primary winding 3a, the parasitic capacitor 2HC of the second high-side switching section 2H, and the parasitic capacitor 2LC of the second low-side switching section 2L. Because of the resonance, the primary current It simultaneously causes the parasitic capacitor 2HC of the second high-side switching section 2H to charge, and the parasitic capacitor 2LC of the second low-side switching section 2L to discharge. Accordingly, the voltage V2H across the second high-side switching section 2H is raised smoothly from zero, and the voltage V2L across the second low-side switching section 2L drops smoothly from the maximum value Vin.

Immediately before the time T6, the voltage V2H across the second high-side switching section 2H reaches the maximum value Vin. At the same time, the voltage V2L across the second low-side switching section 2L reaches zero. Then, the diode 2LD of the second low-side switching section 2L is turned ON, thereby clamping the voltage V2L at zero. At the time T6, the switching control circuit 7 changes the fourth switching signal G4 from L to H, thereby turning ON the second low-side switching section 2L. As a result, ZVS is achieved for the turning-ON of the second low-side switching section 2L.

<Period T6–T7>

During the period T6–T7, the primary winding 3a is short-circuited via the two low-side switching sections 1L and 2L again. Accordingly, commutation occurs on the secondary side of the transformer 3, in the similar operation to that during the period T2–T3. The secondary current flows through both of the two secondary windings 3b and 3c. However, the secondary current flowing through the second secondary winding 3c is larger than that flowing through the first secondary winding 3b, in the opposite manner to that during the period T2–T3. Then, the equivalent primary current does not decrease very much. Furthermore, only the substantially steady voltage (−Vout) is applied to the smoothing inductor 5. Accordingly, both of the primary current It and the secondary current I5 decrease linearly.

<Period T7–T8>

At the time T7, the switching control circuit 7 changes the second switching signal G2 from H to L, thereby turning OFF the first low-side switching section 1L. On the other hand, the second low-side switching section 2L is maintained ON. Then, resonance occurs among the leak inductance of the primary winding 3a, the parasitic capacitor 1HC of the first high-side switching section 1H, and the parasitic capacitor 1LC of the first low-side switching section 1L. Because of the resonance, the primary current It simultaneously causes the parasitic capacitor 1HC of the first high-side switching section 1H to discharge, and the parasitic capacitor 1LC of the first low-side switching section 1L to charge. Hence, the voltage V1H across the first high-side switching section 1H drops smoothly from the maximum value Vin, and the voltage V1L across the first low-side switching section 1L is smoothly raised from zero.

Immediately before the time T8, the voltage V1L across the first low-side switching section 1L reaches the maximum value Vin. At the same time, the voltage V1H across the first high-side switching section 1H reaches zero. Then, the diode 1HD of the first high-side switching section 1H is turned ON, thereby clamping the voltage V1H at zero. At the time T8, the switching control circuit 7 changes the first switching signal G1 from L to H, thereby turning ON the first high-side switching section 1H. As a result, ZVS is achieved for the turning-ON of the first high-side switching section 1H.

At the time T8, the same state as the time T0 reoccurs. Thus, the operations during the period from the time T0 to the time T8 are repeated in cycle.

The time length of the dead time, i.e. each time length of the period T1–T2, the period T3–T4, the period T5–T6, and the period T7–T8, is sufficiently shorter than any time length of the first period T0–T1, the second period T4–T5, and the third periods T2–T3 and T6–T7. Generally, each time length of the first, the second, and the third periods is about several microseconds, but the time length of the dead time is about several tens to several hundreds of nanoseconds.

When the dead times are ignored in comparison with the first period and other periods, the transfer factor (the ratio between the input voltage Vin and the output voltage Vout) in the above-described soft switching is obtained as follows:

Let Ton to be the sum of the time lengths of the first period T0–T1 and the second period T4–T5. In each of these periods, the voltage (Vin/n−Vout) is applied across the smoothing inductor 5 in the above-described manner. Therefore, the magnetic flux to be stored in the smoothing inductor 5 increases by (Vin/n−Vout)×Ton in total during the above-described two periods. On the other hand, let Toff to be the sum of the time lengths of the third periods T1–T4 and T5–T8. During each of the third periods, the voltage (−Vout) is applied across the smoothing inductor 5 in the above-described manner. Therefore, the magnetic flux to be stored in the smoothing inductor 5 decreases by Vout×Toff in total. Accordingly, the reset condition of the smoothing inductor 5 is represented by the similar equation (1) to that of the hard switching:

$$(Vin/n-Vout) \times Ton = Vout \times Toff. \quad (1)$$

Therefore, the transfer factor is represented by the similar equation (2) to that in the hard switching:

$$Vout/Vin = \delta/n,$$

where $$\delta = Ton/(Ton+Toff). \quad (2)$$

In other words, in the soft switching, in the similar manner to that of the hard switching, the control over the duty factor δ for the ON/OFF time of the switches in the high-side switching sections 1H and 2H stably maintains the output voltage Vout at a substantially steady value.

Furthermore, in the soft switching, the four switching sections 1H, 1L, 2H, and 2L are turned ON according to the above-described ZVS. Hence, the surge currents/voltages caused by the switching do not occur in the switching sections, in contrast to the hard switching. Thus, the switching loss in the soft switching is less than that in the hard switching.

The soft switching has the advantage in switching loss over the hard switching, but is at a disadvantage in respect of conduction loss compared with the hard switching as follows: The soft switching achieves the third periods, which corresponds to the periods T2–T3 and T6–T7 in FIG. 9, i.e. the periods during the short-circuited of the primary winding 3a of the transformer 3. During the third periods, the primary current It circulates through the two low-side switching sections 1L and 2L, and the primary winding 3a. In other words, the primary current It is not zero but finite, during the third periods. In this respect, the soft switching is contrast to the hard switching. Each of the switching sections generally includes an ON resistance, and the primary winding 3a of the transformer 3 generally includes a parasitic resistor. These resistors produce Joule heat and thereby dissipate energy when the primary current It flows. Thus, the conduction loss caused by the primary current It during the third periods (hereafter referred to as circulating current loss) in the soft switching is larger than that in the hard switching.

According to the demand for the miniaturization of switching power supplies, the sizes of the switching sections are restricted. As a result, the ON resistance of the switching section has a lower limit. In addition, the smaller the size of the switching power supply, the larger the lower limit of the ON resistance. In such a miniature switching power supply, the increase of the circulating current loss may be larger than the reduction of the switching loss in the soft switching. Then, the efficiency of the switching power supply does not increase sufficiently.

In the full-bridge type converter based on the above-described soft switching (hereafter referred to as an active clamp full-bridge (ACFB) converter), the leak inductance of the primary winding of the transformer is used to cause resonance together with the parasitic capacitors of the switching sections. However, the leak inductance is inherently small. When the leak inductance is too small, a sufficiently large resonance current cannot be obtained, and the parasitic capacitors of the switching sections may be insufficiently charged or discharged. As a result, ZVS cannot be achieved, and the switching loss may increase.

The source of the surge current/voltage caused by the switching is not limited to components in the switching sections. The surge current/voltage may be caused by the turning-OFF of each of the rectifying diodes 4b and 4c at the time of the commutation on the secondary side in both of the conventional switching power supply 100 according to the above-described hard switching and the ACFB converter 110 according to the soft switching. Thereby, the currents Ib and Ic flowing through the respective rectifying diodes 4b and 4c have peaks cf, and the voltages Vb and Vc across the respective rectifying diodes have peaks vf, as shown in FIGS. 7 and 9. The cause of the occurrence of the surge currents/voltages in the rectifying diodes 4b and 4c as follows:

Either of the rectifying diodes 4b and 4c is turned OFF at each start of the first period and the second period. The starts of the first period and the second period correspond to the times T0 and T2 in FIG. 7, and the times T0 and T4 in FIG. 9. A diode generally stores electric charges while it is ON. Thereby, when the diode is turned OFF by an applied reverse bias, the stored charges are discharged as a reverse current. In the above-described switching power supplies 100 and 110, a surge current occurs as the reverse current, when either of the rectifying diodes 4b and 4c is turned OFF caused by the commutation on the secondary side.

The two rectifying diodes 4b and 4c is connected with the two secondary windings 3b and 3c of the transformer 3, respectively. For example, when the first rectifying diode 4b is turned OFF, resonance occurs between the parasitic capacitance of the first rectifying diode 4b and the leak inductance of the first secondary winding 3b based on the above-described reverse current. Thereby, a surge voltage occurs across the first rectifying diode 4b. Similarly, a surge voltage occurs across the second rectifying diode 4c based on the reverse current, when the diode is turned OFF.

The surge currents/voltages caused by the turning-ON/ OFF of the above-described rectifying diodes produce noises. The power loss caused by the noise is a part of the switching loss of the switching power supply, and undesirably reduces the efficiency of the switching power supply.

BRIEF SUMMARY OF THE INVENTION

The object of the present invention is to provide a switching power supply that may reduce the circulating current loss in addition to the reduction of the switching loss by the soft switching.

The switching power supply according to the present invention comprises:

a DC-DC converter
 (A) including:
  (a) four switching sections of a first high-side switching section, a second high-side switching section, a first low-side switching section, and a second low-side switching section, each having (1) a switching device that is turned ON/OFF according to a switching signal from the outside, (2) a diode connected in parallel with the switching device, and (3) a capacitance connected in parallel with the switching device;
  (b) a transformer having (1) a primary winding, and (2) a first secondary winding and a second secondary winding connected in series whose Junction point is a common terminal;
  (c) a first rectifying section and a second rectifying section, each having (1) a rectifying device and (2) a snubber connected in parallel with the rectifying device, the snubber having a snubber capacitor; and
  (d) a smoothing section having a first input terminal and a second input terminal, for smoothing an input supplied via the input terminals, and for outputting the smoothed input;
 in the DC-DC converter,
 (B) the cathode of the first high-side switching section is connected with the higher potential terminal of a substantially steady direct voltage source, the anode of the first high-side switching section is connected with the cathode of the first low-side switching section, and the anode of the first low-side switching section is connected with the lower potential terminal of the substantially steady direct voltage source;
 (C) the cathode of the second high-side switching section is connected with the higher potential terminal of the substantially steady direct voltage source, the anode of the second high-side switching section is connected with the cathode of the second low-side switching section, and the anode of the second low-side switching section is connected with the lower potential terminal of the substantially steady direct voltage source;
 (D) one terminal of the primary winding of the transformer is connected with the junction point between the first high-side switching section and the first low-side switching section, and the other terminal of the primary winding is connected with the junction point between the second high-side switching section and the second low-side switching section;
 (E) a terminal other than the common terminal of the first secondary winding of the transformer is connected with the anode of the first rectifying section, a terminal other than the common terminal of the second secondary winding is connected with the anode of the second rectifying section, and the common terminal is connected with the first input terminal of the smoothing section; and
 (F) the cathode of each of the first rectifying section and the second rectifying section is connected with the second input terminal of the smoothing section; and
a switching control section for
 (A) determining a delay time based on a resonance cycle depending on the equivalent capacitance of the snubber in each of the first rectifying section and the second rectifying section, and the leak inductance on the secondary side of the transformer with the primary winding short-circuited; and
 (B) outputting the switching signal with a predetermined switching frequency and a predetermined phase to each of the four switching sections, thereby
  (a) achieving a first period and a second period sequentially with predetermined time lengths and predetermined cycle periods, (1) during the first period, the first high-side switching section and the second low-side switching section are ON and the second high-side switching section and the first low-side switching section are OFF, and (2) during the second period, the first high-side switching section and the second low-side switching section are OFF and the second high-side switching section and the first low-side switching section are ON;
  (b) at the end of the first period, turning OFF one of the first high-side switching section and the second low-side switching section the delay time later than the turning-OFF of the other switching section; and
  (c) at the end of the second period, turning OFF one of the second high-side switching section and the first low-side switching section the delay time later than the turning-OFF of the other switching section.

In the above-described switching power supply, the high-side and low-side switching sections that are ON during each of the first period and the second period are both OFF at the time when the delay time elapsed from each end of the periods. Then, the primary current, i.e. the current flowing through the primary winding of the transformer, quickly attenuates as follows.

During the first period, the first rectifying section is OFF, and during the second period, the second rectifying section is OFF. Thereby, full-wave rectification is achieved on the secondary side of the transformer. Then, in the OFF-side rectifying section, the snubber capacitor stores charges by a reverse bias. At each end of the first period and the second period, the induced voltage across each of the secondary windings drops to zero. Then, the snubber capacitor discharges in the OFF-side rectifying section. The discharge current causes a current to start flowing through the secondary winding connected with the rectifying section before the rectifying device is ON in the rectifying section. Based on the current, resonance occurs between the snubber capacitor and the leak inductance on the secondary side of the transformer. Here, the leak inductance on the secondary side of the transformer is defined as the leak inductance equivalently produced between the terminals other than the common terminal of the two secondary windings when the primary winding is short-circuited. In the description, the leak inductance is referred to as the leak inductance on the secondary side of the transformer with the primary winding short-circuited. Accordingly, the commutation of the secondary current of the transformer progresses smoothly and quickly, in contrast to the conventional switching power supply. In other words, substantially equal amounts of the secondary currents begin to flow through both the secondary windings immediately after each of the first period and the second period. As a result, the equivalent primary current is smoothly and quickly cancelled between the secondary currents flowing through the two secondary windings. Hence, the primary current is smoothly and quickly reduced at each end of the first period and the second period. Therefore, surge voltages are reduced when the primary current is cut off the above-described delay time later, and the switching loss caused by the cut-off of the primary current is thus reduced. Furthermore, the circulating current loss caused by the primary current is reduced, since the primary current is cut off between the first period and the second period.

In the above-described switching power supply, the switching control section may:
(a) at the end of the first period, turns OFF the second low-side switching section the delay time later than the turning-OFF of the first high-side switching section: and
(b) at the end of said second period, turns OFF the first low-side switching section the delay time later than the turning-OFF of the second high-side switching section.

In this switching power supply, the primary current of the transformer circulates through the two low-side switching sections and the primary winding until the corresponding delay time elapsed after each end of the first period and the second period.

Alternatively, the switching control section may:
(a) at the end of the first period, turns OFF the first high-side switching section the delay time later than the turning-OFF of the second low-side switching section; and
(b) at the end of the second period, turns OFF the second high-side switching section the delay time later than the turning-OFF of the first low-side switching section.

In this switching power supply, the primary current of the transformer circulates through the two high-side switching sections and the primary winding until the corresponding delay time elapsed after each end of the first period and the second period.

Apart from the above-described, the switching control section may:
(a) at the end of the first period, turns OFF the second low-side switching section the delay time later than the turning-OFF of the first high-side switching section; and
(b) at the end of the second period, turns OFF the second high-side switching section the delay time later than the turning-OFF of the first low-side switching section.

In this switching power supply, the primary current of the transformer circulates through the two low-side switching sections and the primary winding until the delay time elapsed after the end of the first period. On the other hand, the primary current of the transformer circulates through the two high-side switching sections and the primary winding until the delay time elapsed after the end of the second period. The above-described alternating of the current circulating sections equalizes stresses exerted on the switching sections.

In the above-described switching power supply, the switching control section may:
(A) determines a first dead time based on a resonance cycle depending on the equivalent capacitance of the first high-side switching section, the equivalent capacitance of the first low-side switching section, and the leak inductance of the primary winding of the transformer;
(B) determines a second dead time based on a resonance cycle depending on the equivalent capacitance of the second high-side switching section, the equivalent capacitance of the second low-side switching section, and the leak inductance of the primary winding of the transformer; and
(C) at each end of the first period and the second period, achieves one of the periods
(a) when the first high-side switching section and the first low-side switching section are both OFF during the first dead time; and
(b) when the second high-side switching section and the second low-side switching section are both OFF during the second dead time.

For example, at the end of the first period, the first high-side switching section is turned OFF earlier than the second low-side switching section. Then, resonance occurs among the leak inductance of the primary winding of the transformer and the equivalent capacitances of the first high-side switching section and the first low-side switching section. By the resonance, the capacitor in the first high-side switching section charges, and the capacitor in the first low-side switching section discharges. Furthermore, when the capacitor in the first low-side switching section discharges completely, the diode in the same switching section is turned ON, thereby clamping the voltage across the switching section at zero. In this state, the second low-side switching section is turned ON. Hence, in the above-described switching power supply, ZVS is achieved for the turning-ON of the second low-side switching section. Therefore, the switching loss is reduced. When the second low-side switching section is turned OFF earlier at the end of the first period, and even at the end of the second period, ZVS is similarly achieved for the switching section that is turned ON earlier.

The dead time is determined based on the resonance cycle depending on the equivalent capacitance of the high-side switching section, the equivalent capacitance of the low-side switching section, and the leak inductance of the primary winding of the transformer. Preferably, the dead time is substantially equal to ¼ times the resonance cycle. On the other hand, the delay time is determined based on the resonance cycle depending on both of the equivalent capacitance of the snubber and the leak inductance on the secondary side of the transformer with the primary winding short-circuited. Preferably, the delay time is substantially equal to ¼ times the resonance cycle. The delay time is mainly adjusted with the capacitance of the snubber capacitor. Therefore, in the above-described switching power supply, the primary current is cut off immediately after the above-described ZVS is achieved. Thus, the circulating current loss is reduced along with the switching loss.

In the above-described switching power supply, the snubber may include a resistor connected in series with the snubber capacitor. At the starts of the first period and the second period, an induced voltage from the primary side is produced across each of the secondary windings of the transformer. Thereby, either of the two rectifying sections being ON is turned OFF. In the rectifying section that is then turned OFF, resonance occurs between the snubber capacitor and the leak inductance on the secondary side of the transformer. The resistor in the snubber attenuates the resonance quickly. Thereby, the ringing caused by the resonance is suppressed, and in addition, the peak of the voltage applied across the rectifying device in parallel with the snubber is reduced.

Furthermore, in the above-described switching power supply, (a) the snubber may include an auxiliary rectifying device connected in parallel with the resistor; and (b) one pair of the anodes and the cathodes of the rectifying device and the auxiliary rectifying device may be connected with each other. At each end of the first period and the second period, the snubber capacitor discharges in the OFF-side rectifying section. Then, the discharge current flows through the auxiliary rectifying device in parallel with the resistor, thereby avoiding the reduction by the resistor. Accordingly, the peak of the resonance current increases in the resonance between the equivalent capacitance of the snubber and the leak inductance on the secondary side of the transformer. As a result, the equivalent primary current is sufficiently and more quickly cancelled at each end of the first period and the second period, and thus the primary current is sufficiently reduced. Accordingly, not only the conduction loss caused by the resistor in the snubber but also the switching and circulating current losses caused by the primary current are reduced. In addition, the heat generation of the resistor in the snubber caused by the discharge current is suppressed. Thereby, increase of the resistance and impairment of the functions of other devices owing to the heat are prevented.

In the above-described switching power supply, the rectifying device and the auxiliary rectifying device included in the snubber are preferably diodes. Alternatively, they may be semiconductor switching devices, such as IGBTs and MOSFETs. In this case, the switching control section preferably controls the switching of the semiconductor switching devices in synchronization with the switching of the switching sections in the full-bridge on the primary side.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The following is the description of preferred examples of the preferred embodiment according to the present invention.

EXAMPLE 1

A switching power supply 10 according to Example 1 of the present invention has a full-bridge type converter. A switching control circuit 7 performs hard switching for the turning-ON of four switching sections 1H, 1L, 2H, and 2L constituting a full-bridge.

Figure 1:
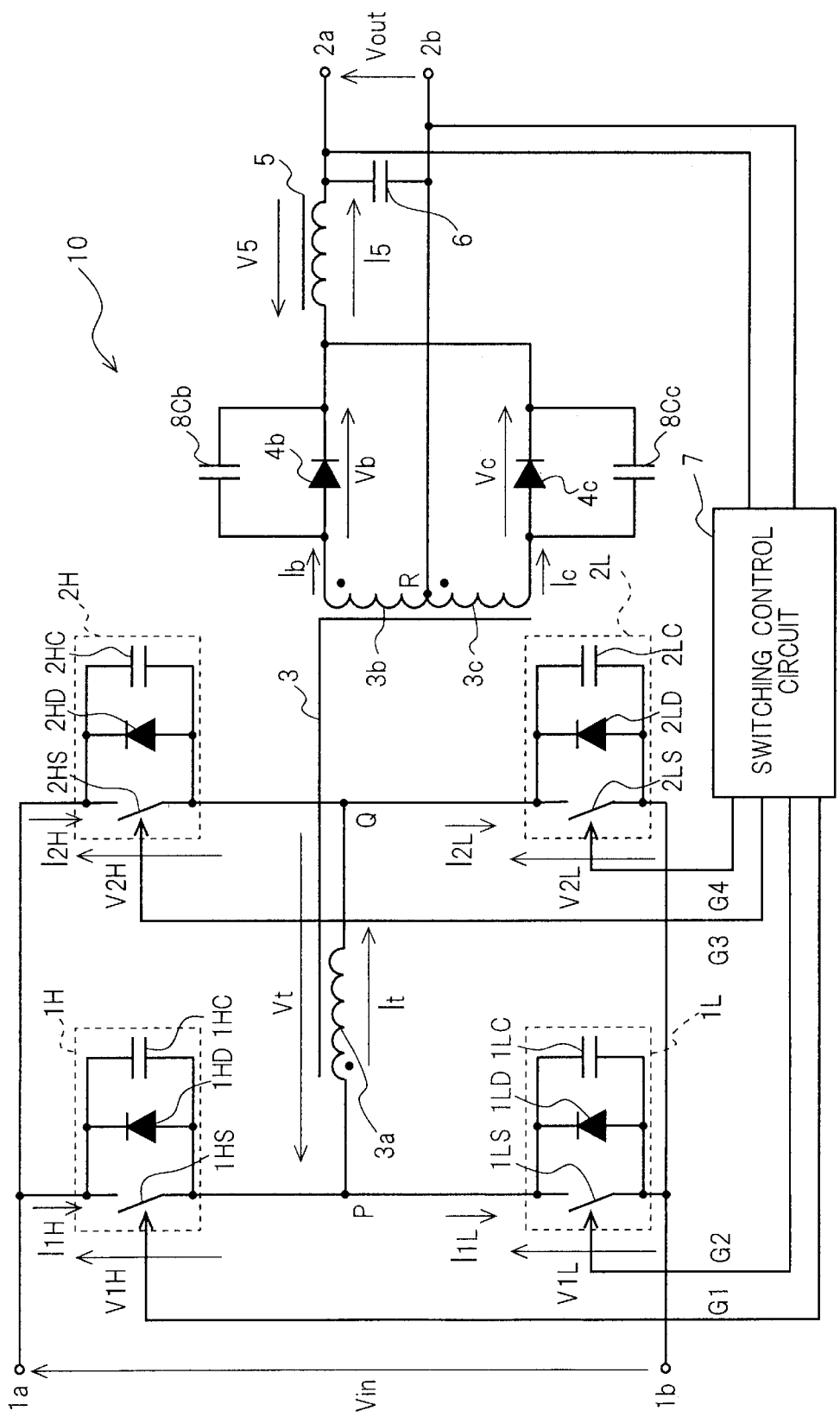
FIG. 1 is a circuit diagram of a switching power supply 10 according to Example 1 of the present invention.
Figure 8:
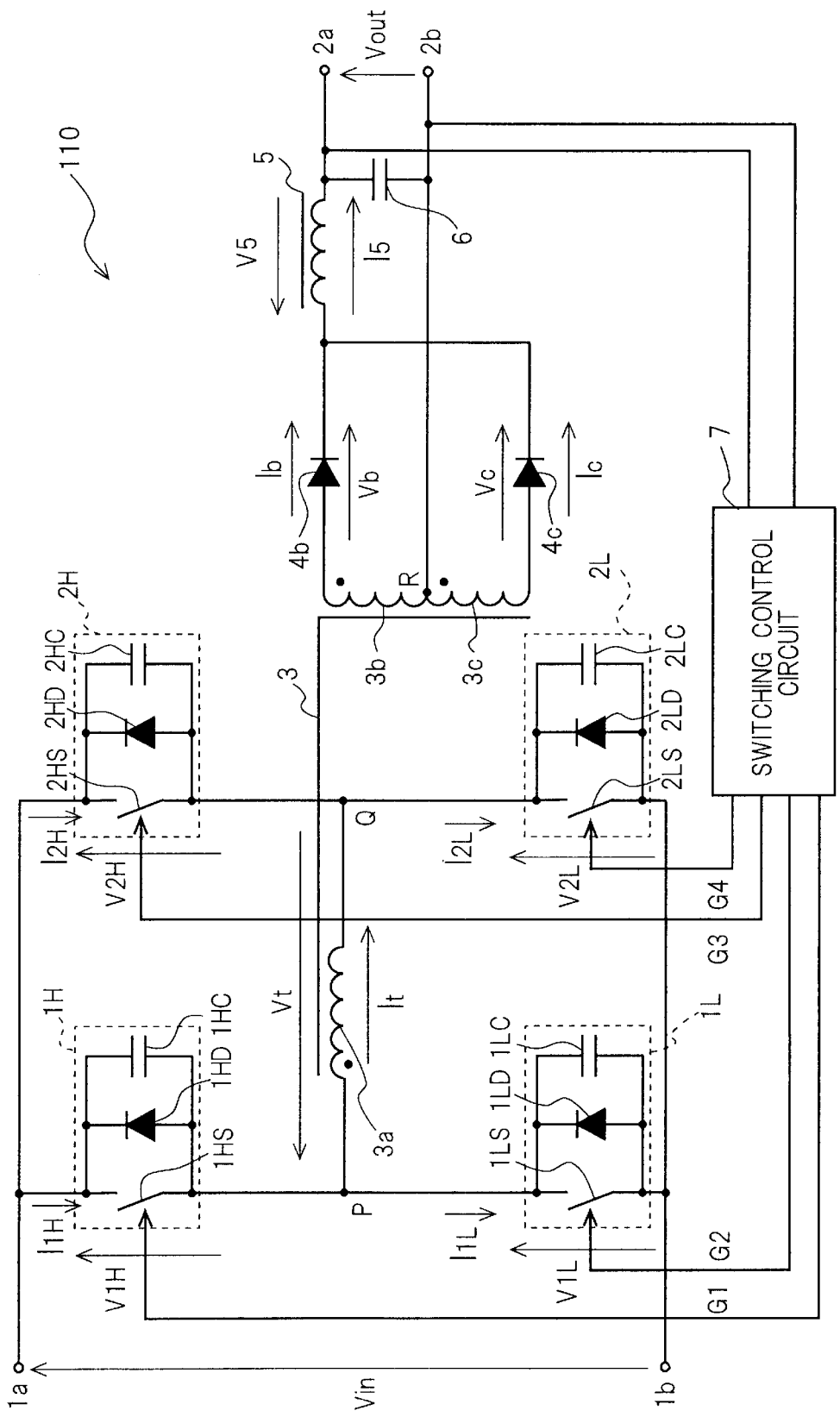
FIG. 8 is the circuit diagram of the switching power supply 110 according to the conventional soft switching.
Figure 9:
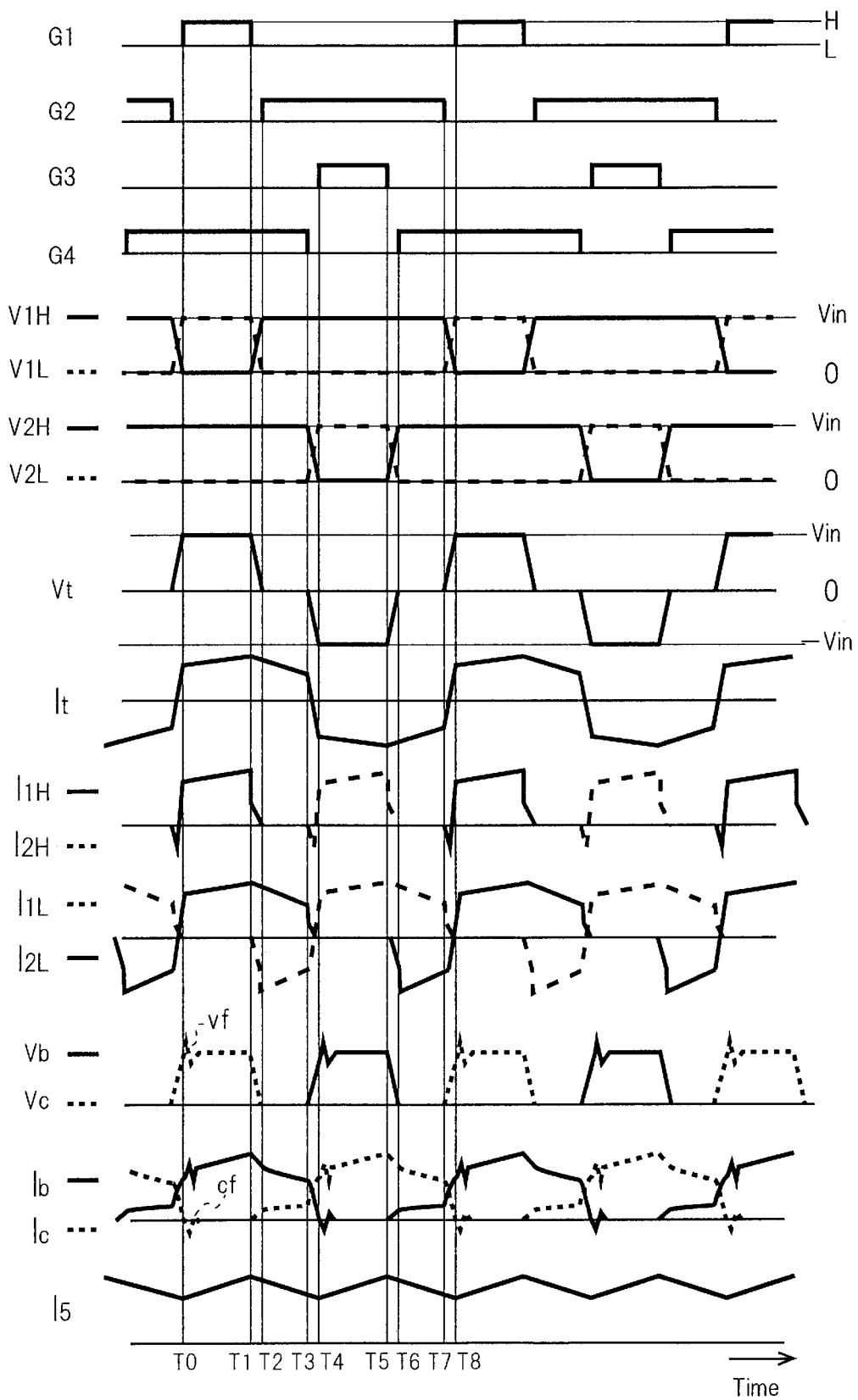
FIG. 9 is the diagram showing the waveforms of the currents and voltages occurring at various sections of the circuit shown in FIG. 8 by the soft switching of the conventional switching power supply 110.

FIG. 1 is a circuit diagram of the switching power supply 10 according to Example 1. The switching power supply 10 according to Example 1 has two snubber capacitors 8C$b$ and 8C$c$ on the secondary side of a transformer 3. Hence, the circuit configuration of the switching power supply 10 differs from those of conventional switching power supplies, such as the conventional example 110 shown in FIG. 8, as clearly understood in comparison between FIG. 1 and FIG. 8.

A DC power source is connected with input terminals 1$a$ and 1$b$. The DC power source may be one substantially obtained by rectifying alternating current from an AC power source. Let Vin to be an input voltage from the DC power source. Furthermore, the higher and the lower potential sides of the DC power source are connected with the first input terminal 1$a$ and the second input terminal 1$b$, respectively.

Each of four switching sections 1H, 1L, 2H, and 2L includes, between the two terminals, a switching device, a diode, and a capacitor connected in parallel. In particular, each of the switching sections has the same polarity as the diode. The cathode and anode of the switching section are defined as the terminals connected with the cathode and anode of the diode, respectively. Furthermore, the characteristics of the circuit devices are common among the four switching sections.

The four switching sections are connected in series two by two, thereby forming two pairs. Furthermore, these pairs are connected in parallel. Between the two switching sections in each pair, the connected one with the first input terminal 1$a$ is referred to as a high-side switching section, and the other one connected with the second input terminal 1$b$ is referred to as a low-side switching section. In FIG. 1, a first high-side switching section 1H is connected in series with a first low-side switching section 1L, and a second high-side switching section 2H is connected in series with a second low-side switching section 2L. The anode of the first high-side switching section 1H is connected with the cathode of the first low-side switching section 1L at a first junction point P. The anode of the second high-side switching section 2H is connected with the cathode of the second low-side switching section 2L at a second junction point Q. The cathode of the first high-side switching section 1H and the cathode of the second high-side switching section 2H are both connected with the first input terminal 1a. The anode of the first low-side switching section 1L and the anode of the second low-side switching section 2L are both connected with the second input terminal 1b.

Switching devices 1HS, 1LS, 2HS, and 2LS are preferably MOSFETs. Alternatively, they may be bipolar transistors or IGBTs.

Diodes 1HD, 1LD, 2HD, and 2LD are preferably body diodes of the switching devices 1HS, 1LS, 2HS, and 2LS in the switching sections 1H, 1L, 2H, and 2L, respectively. Alternatively, the diodes may be separate devices from the switching devices 1HS, 1LS, 2HS, and 2LS.

Four capacitances 1HC, 1LC, 2HC, and 2LC are parasitic capacitors of the switching devices 1HS, 1LS, 2HS, and 2LS in the switching sections 1H, 1L, 2H, and 2L, respectively. It is assumed that they are connected in parallel with the corresponding switching devices. The capacitances 1HC, 1LC, 2HC, and 2LC equivalently include the parasitic capacitors of the wires and the transformer 3. In addition, the capacitances 1HC, 1LC, 2HC, and 2LC may include capacitances as separate devices from the switching devices 1HS, 1LS, 2HS, and 2LS.

The primary winding 3a of the transformer 3 is connected between the junction points P and Q of the pairs of the switching sections. The transformer 3 has two secondary windings 3b and 3c. The turn ratio of the primary winding 3a, the first secondary winding 3b, and the second secondary winding 3c is n:1:1, where n is a positive real number. The common terminal R of the secondary windings 3b and 3c, i.e. the junction point of the secondary windings 3b and 3c, is connected with a second output terminal 2b. The other terminals of the secondary windings 3b and 3c are connected with the anodes of a first rectifying diode 4b and a second rectifying diode 4c, respectively. The cathodes of the first rectifying diode 4b and the second rectifying diode 4c are both connected with one terminal of a smoothing inductor 5. The two rectifying diodes 4b and 4c perform full-wave rectification for the output of the transformer 3.

The other terminal of the smoothing inductor 5 is connected with a first output terminal 2a. The inductance of the smoothing inductor 5 is sufficiently larger than the inductances of the other circuit devices, such as the transformer 3. One terminal of a smoothing capacitor 6 is connected between the first output terminal 2a and the smoothing inductor 5, and the other terminal of the smoothing capacitor 6 is connected with the second output terminal 2b. The capacitance of the smoothing capacitor 6 is sufficiently larger than the capacitances in the switching sections and of the snubber capacitors 8Cb and 8Cc. The smoothing inductor 5 and the smoothing capacitor 6 form a smoothing filter whereby the output of the transformer 3 rectified via the two rectifying diodes 4b and 4c is smoothened. Thus, the voltage across the smoothing capacitor 6, equivalently the output voltage Vout between the two output terminals 2a and 2b, is substantially steady.

The first snubber capacitor 8Cb is connected in parallel with the first rectifying diode 4b, and the second snubber capacitor 8Cc is connected in parallel with the second rectifying diode 4c. Thus, in Example 1, the first rectifying diode 4b and the first snubber capacitor 8Cb form a first rectifying section, and the second rectifying diode 4c and the second snubber capacitor 8Cc form a second rectifying section. The capacitances of the snubber capacitors 8Cb and 8Cc are substantially equal to each other and sufficiently larger than the capacitances of the parasitic capacitors 1HC, 1LC, 2HC, and 2LC in the switching sections.

The switching control circuit 7 is connected with the two output terminals 2a and 2b, and measures the output voltage Vout. Furthermore, the switching control circuit 7 is connected with the switching devices 1HS, 1LS, 2HS, and 2LS, and controls the turning-ON/OFF of the switching devices by using switching signals G1, G2, G3, and G4. The switching devices are preferably MOSFETs. Then, the switching control circuit 7 is connected with the gates of the switching devices, and outputs voltage signals to the gates as the switching signals G1, G2, G3, and G4. Thereby, the switching control circuit 7 changes the gate potentials and turns ON/OFF the respective switching devices. In particular, the switching control circuit 7 adjusts the switching frequency, i.e. the frequency of the switching signals G1–G4 based on the measured output voltage Vout. Thereby, the switching control circuit 7 controls the duty factor for the ON/OFF time of the switching devices 1HS, 1LS, 2HS, and 2LS, and maintains the steady output voltage Vout.

The switching power supply 10 according to Example 1 performs the following switching for the four switching sections constituting the full-bridge.

In the switching power supply 10, as shown in FIG. 1, the input voltage Vin is applied across the two input terminals 1a and 1b, and the output voltage Vout is applied across the two output terminals 2a and 2b. The input voltage Vin and the output voltage Vout are maintained substantially steady.

Figure 2:
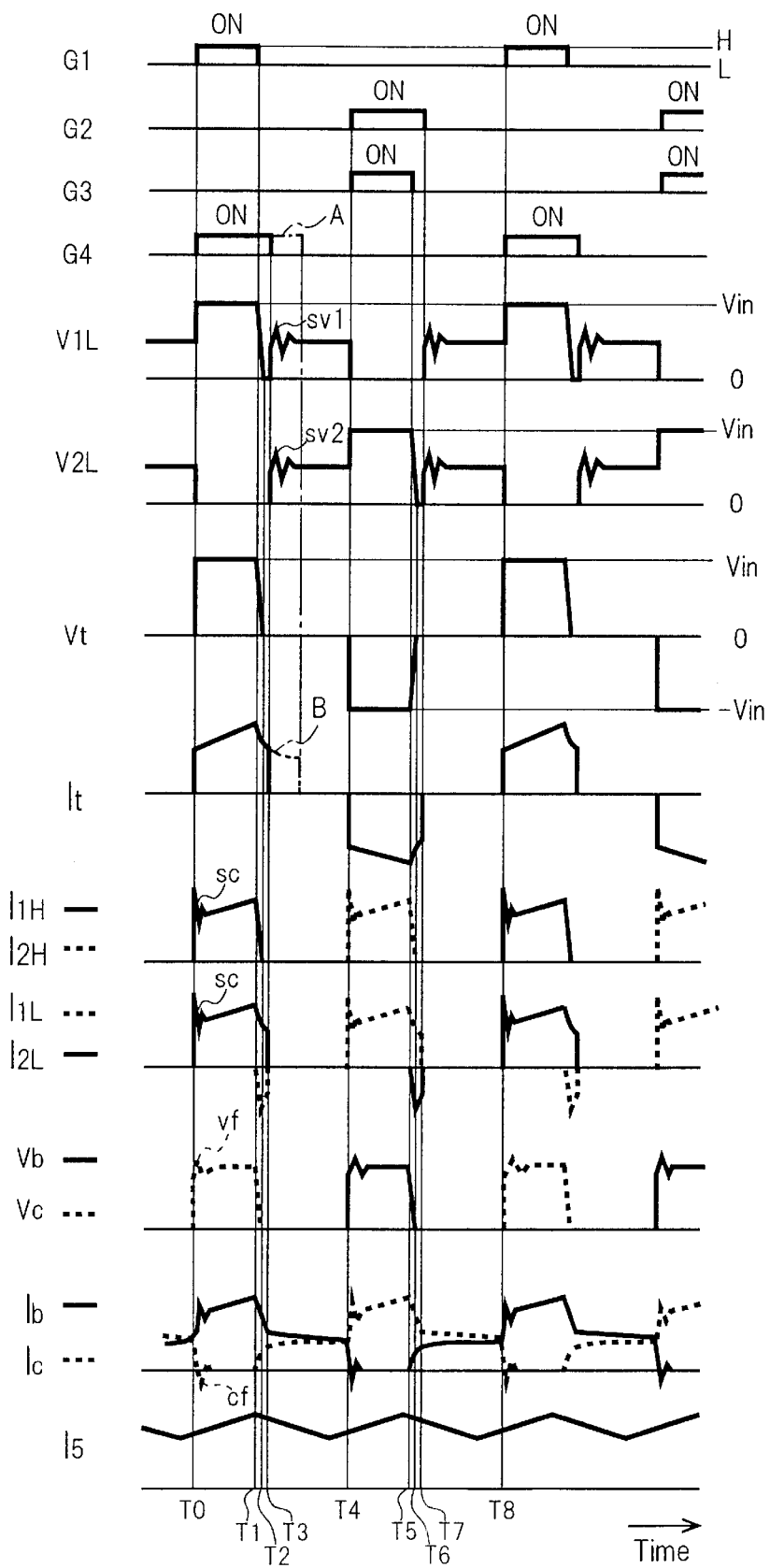
FIG. 2 is a diagram showing the waveforms of the currents and voltages occurring at various sections of the circuit shown in FIG. 1 by the switching of the switching power supply 10 according to Example 1.

FIG. 2 is a diagram showing the waveforms of the currents and voltages occurring at various sections of the circuit shown in FIG. 1 by the switching of the switching power supply 10.

The switching signals G1, G2, G3, and G4 are rectangular waves with predetermined widths. During the interval when the switching signals G1, G2, G3, and G4 are H (high potential), the respective switching devices 1HS, 1LS, 2HS, and 2LS are ON. On the other hand, during the interval when the switching signals G1, G2, G3, and G4 are L (low potential), the respective switching devices 1HS, 1LS, 2HS, and 2LS are OFF.

Voltages V1H, V1L, V2H, and V2L are voltages applied across the switching sections 1H, 1L, 2H, and 2L, respectively. For each polarity of the voltages, the positive direction is defined as the direction of the arrow in FIG. 1 is positive; in other words, it is defined that the potential at the cathode, i.e. the terminal on the side of the first input terminal 1a, with respect to the anode, i.e. the terminal on the side of the second input terminal 1b, is positive. The voltage VH across the high-side switching section is substantially equal to the difference between the input voltage Vin and the voltage VL across the low-side switching section paired with the high-side switching section: VH=Vin−VL. Hence, FIG. 2 shows only the voltage V1L across the low-side switching section IL and the voltage V2L across the low-side switching section 2L.

The currents I1H, I1L, I2H, and I2L flow through the switching sections 1H, 1L, 2H, and 2L, respectively. For each polarity of the currents, the positive direction is defined as the direction of the arrow in FIG. 1, i.e. the direction from the cathode to the anode.

A primary voltage Vt is the voltage applied across the primary winding 3a of the transformer 3. For the polarity of the voltage, the positive direction is defined as the direction of the arrow in FIG. 1; in other words, it is defined that the potential at the first junction point P with respect to the second junction point Q is positive. The primary voltage Vt is substantially equal to the difference between the voltage V1L across the low-side switching section 1L and the voltage V2L across the low-side switching section 2L: Vt=V1L−V2L.

A primary current It is the current flowing through the primary winding 3a of the transformer 3. For the polarity of the current, the positive direction is defined as the direction of the arrow in FIG. 1; in other words, it is defined that the direction from the first junction point P to the second junction point Q is positive. The primary current It is substantially equal to the difference between the current flowing through the high-side switching section and the current flowing through the low-side switching section: It I1H−I1L=−I2H+I2L.

Voltages Vb and Vc are the voltages across the first rectifying diode 4b and the second rectifying diode 4c, respectively. For the polarity of the voltages, the positive directions are defined as the directions of the respective arrows in FIG. 1. In other words, it is defined that the directions of the reverse biases for the respective rectifying diodes are positive. Since the turn ratio of the primary winding 3a, the first secondary winding 3b, and the second secondary winding 3c is n:1:1, the voltage across each of the two secondary windings 3b and 3c is substantially equal to 1/n times the primary voltage Vt, in short, Vt/n.

Secondary currents Ib and Ic are currents flowing through the two secondary windings 3b and 3c of the transformer 3, respectively. For the polarity of the currents, the positive directions are defined as the direction of the respective arrows in FIG. 1. In other words, it is defined that the direction from the common terminal R to the other terminal of the first secondary winding 3b is the positive direction of the first secondary current Ib, and the direction from the other terminal of the second secondary winding 3c to the common terminal R is the positive direction of the second secondary current Ic.

A current I5 is the current flowing through the smoothing inductor 5, and is substantially equal to the output current of the switching power supply 10. For the polarity of the current, the positive direction is defined as the direction of the arrow in FIG. 1; in other words, it is defined that the direction from the terminal on the side of the transformer 3 to the other terminal on the side of the first output terminal 2a is positive. The output current I5 is substantially equal to the sum of the two secondary currents Ib and Ic: I5=Ib+Ic.

The primary current It is equal to the sum of the exciting current for the transformer 3 and the equivalent primary current depending on the secondary currents of the transformer 3. The equivalent primary current is obtained from the two secondary currents Ib and Ic of the transformer 3 according to the following steps: (1) obtaining the ratio of the mutual inductance between the primary winding 3a and the first secondary winding 3b to the self-inductance of the primary winding 3a; (2) obtaining the product of the ratio and the first secondary current Ib; (3) obtaining the similar product for the second secondary winding 3c; (4) obtaining the sum of the product for the first secondary winding 3b and the product for the second secondary winding 3c. The sum is substantially equal to the equivalent primary current. The equivalent primary current in Example 1 is substantially equal to 1/n times the difference between the first secondary current Ib and the second secondary current Ic, in short, (Ib−Ic)/n.

The switching control circuit 7 performs a hard switching for the turning-ON of the four switching sections, i.e. simultaneously turns ON one high-side switching section and one low-side switching section. On the other hand, for the turning-OFF of the switching sections, the switching control circuit delays the turning-OFF of one of the switching sections by a delay time from the turning-OFF of the other, as described later. The switching by the switching control circuit 7 achieves the following four periods sequentially with predetermined time lengths and predetermined cycle periods: (1) A first period corresponds to the period T0–T1 in FIG. 2. During the first period, the first high-side switching section 1H and the second low-side switching section 2L are ON, and the second high-side switching section 2H and the first low-side switching section 1L are OFF. (2) A second period corresponds to the period T4–T5 in FIG. 2. During the second period, the first high-side switching section 1H and the second low-side switching section 2L are OFF, and the second high-side switching section 2H and the first low-side switching section 1L are ON. (3) A third period corresponds to each of the period T3–T4 and the period T7–T8 in FIG. 2, and is achieved between the first period and the second period. During the third period, all the four switching sections are OFF. (4) A fourth period corresponds to each of the period T1–T3 and the period T5–T7 in FIG. 2, and is achieved at each end of the first period and the second period. At the start of the fourth period, one of the two switching sections that are ON immediately before the start is turned OFF earlier than the other. At the end of the fourth period, the other of the two switching sections is turned OFF. The length of the fourth period is referred to as a delay time.

The following is the description of the switching by the switching control circuit 7 in the sequence from the time T0 to the time T8 shown in FIG. 2.

<Period T0–T1>

At the time T0, the switching control circuit 7 simultaneously changes the first switching signal G1 and the fourth switching signal G4 from L to H, thereby turning ON the first high-side switching section 1H and the second low-side switching section 2L. On the other hand, the first low-side switching section 1L and the second high-side switching section 2H are both OFF.

During the period T0–T1, the substantially steady and positive input voltage Vin is applied across the primary winding 3a of the transformer 3 via the first high-side switching section 1H and the second low-side switching section 2L. In other words, the voltage Vt across the primary winding 3a is substantially equal to the input voltage Vin. Furthermore, the primary current It of the transformer 3 flows from the first junction point P to the second junction point Q of the primary winding 3a, i.e. in the direction of the arrow shown in FIG. 1. Then, a positive voltage Vin/n is induced at the secondary windings 3b and 3c of the transformer 3. Then, the voltage V5 across the smoothing inductor 5 is substantially equal to Vin/n−Vout, since the first rectifying diode 4b is ON. Accordingly, the output current I5 flowing through the smoothing inductor 5 increases linearly in the direction of the arrow shown in FIG. 1 during the period T0–T1. However, the increase of the current I5 flowing through the smoothing inductor 5 is slow, since the inductance of the smoothing inductor 5 is sufficiently large. The second rectifying diode 4c is OFF, since the voltage Vc across the second rectifying diode 4c is substantially equal to +2Vin/n and positive. Therefore, the current I5 of the smoothing inductor 5 is substantially equal to the first secondary current Ib. In other words, during the period T0–T1, the secondary current of the transformer 3 flows only through the first secondary winding 3b and increases linearly. When the second rectifying diode 4c is OFF, the second snubber capacitor 8Cc stores charges in proportion to the reverse bias Vc=2Vin/n across the second rectifying diode 4c.

The primary current It of the transformer 3 is substantially equal to the sum of the exciting current and the equivalent primary current as described above. As shown in FIG. 2, during the period T0–T1, the primary voltage Vt is maintained at the substantially steady value Vin. Therefore, the exciting current in the primary current It linearly increases in substance. On the other hand, the equivalent primary current increases linearly, since the secondary current of the transformer 3 increases linearly as described above. Accordingly, the primary current It linearly increases in substance.

<Period T1–T3>

At the time T1, the switching control circuit 7 changes the first switching signal G1 from H to L, thereby turning OFF the first high-side switching section 1H. On the other hand, the second low-side switching section 2L is maintained ON. Then, resonance occurs among the leak inductance of the primary winding 3a, the parasitic capacitor 1HC of the first high-side switching section 1H, and the parasitic capacitor 1LC of the first low-side switching section 1L. Because of the resonance, the primary current It simultaneously causes the parasitic capacitor 1HC of the first high-side switching section 1H to charge and the parasitic capacitor 1LC of the first low-side switching section 1L to discharge. Accordingly, the voltage V1H across the first high-side switching section 1H is smoothly raised from zero, and the voltage V1L across the first low-side switching section 1L drops smoothly from the maximum value Vin.

At the time T2, the voltage V1H across the first high-side switching section 1H reaches the maximum value Vin. At the same time, the voltage V1L across the first low-side switching section 1L reaches zero. Then, the diode 1LD of the first low-side switching section 1L is turned ON, thereby clamping the voltage V1L at zero. Thereby, the primary voltage Vt drops smoothly in the similar manner and is clamped at zero.

During the period T1–T2, in each of the first secondary winding 3b and the second secondary winding 3c, the voltage across the secondary winding drops as the primary voltage Vt drops. Then, the voltage Vb across the diode is substantially zero, since the first rectifying diode 4b is ON. On the other hand, the voltage Vc across the second rectifying diode 4c drops. In other words, the reverse bias across the second rectifying diode 4c decreases. Thereby, the second snubber capacitor 8Cc discharges. Based on the discharge current, resonance occurs between the second snubber capacitor 8Cc and the leak inductance on the secondary side of the transformer 3. Here, the leak inductance on the secondary side is substantially equal to the leak inductance equivalently occurring across the terminal of the first secondary winding 3b other than the common terminal R, and the terminal of the second secondary winding 3c other than the common terminal R, on the secondary side of the transformer 3 during when the primary winding 3a is short-circuited. The leak inductance is hereafter referred to as the leak inductance on the secondary side of the transformer with the primary winding short-circuited. Furthermore, the capacitance of the second snubber capacitor 8Cc is sufficiently larger than the capacitance of the parasitic capacitor in the switching section. Accordingly, the resonance cycle between the second snubber capacitor 8Cc and the above-described leak inductance on the secondary side is sufficiently longer than the resonance cycle between the parasitic capacitor in the switching section and the primary winding 3a. As a result, the voltage Vc across the second rectifying diode 4c drops more slowly than the primary voltage Vt after the time T1, and reaches zero immediately before the time T3 that is after the time T2. Then, the second rectifying diode 4c is turned ON.

The second snubber capacitor 8Cc discharges by the resonance during the period T1–T3. The discharge current increases quickly and smoothly the second secondary current Ic flowing through the second secondary winding 3c. Thereby, the first secondary current Ib flowing through the first secondary winding 3b decreases quickly and smoothly. As a result, the difference between the secondary currents Ib and Ic that respectively flow through the secondary windings 3b and 3c is almost negligible nearly at the time T3. Thus, cancellation occurs speedily between the secondary currents of the secondary windings 3b and 3c in the period T1–T3, and reduces quickly and smoothly the equivalent primary current to zero in substance. Therefore, the primary current It decreases quickly and smoothly from the value at the time T1.

<Period T3–T4>

At the time T3, the switching control circuit 7 changes the fourth switching signal G4 from H to L, thereby turning OFF the second low-side switching section 2L. Thus, all the four switching sections are OFF. Then, the voltage V1L across the low-side switching section 1L and the voltage V2L across the low-side switching section 2L are both zero. Accordingly, the voltage V1H across the high-side switching section 1H and the voltage V2H across the high-side switching section 2H are both equal to the input voltage Vin. After the time T3, the voltages across the high-side switching sections drop from Vin with ringing, and the voltages across the low-side switching sections are raised from zero with ringing.

During the period T3–T4, the primary voltage Vt of the transformer 3 is maintained at substantially zero. Accordingly, the induced voltages across the two secondary windings 3b and 3c of the transformer 3 are similarly maintained at zero. Furthermore, the first rectifying diode 4b and the second rectifying diode 4c are both ON. Therefore, the voltage V5 across the smoothing inductor 5 is maintained at a negative steady voltage −Vout. As a result, the output current I5 flowing through the smoothing inductor 5 decreases smoothly and linearly with a slight inclination.

Once the primary current It of the transformer 3 decreases quickly during the period from T1–T3, the primary current It is further speedily reduced to zero at the time T3. Accordingly, the decrease is gentle in contrast to the conventional hard switching, and noises such as undershoots are therefore reduced.

After the time T3, the primary current It does not flow substantially. Accordingly, the secondary current of the transformer 3 continuously flows through each of the two secondary windings 3b and 3c, wherein one part of the secondary current flowing through the first secondary winding 3b is substantially equal in amount and opposite in direction to the other part flowing through the second secondary winding 3c, so that the equivalent primary current is zero. In other words, the first secondary current Ib is substantially equal to the second secondary current Ic during the period T3–T4.

<Period T4–T5>

At the time T4, the switching control circuit 7 simultaneously changes the second switching signal G2 and the third switching signal G3 from L to H, thereby turning ON the first low-side switching section 1L and the second high-side switching section 2H. On the other hand, the first high-side switching section 1H and the second low-side switching section 2L are both OFF. When the first low-side switching section 1L and the second high-side switching section 2H are ON, the input voltage Vin is applied across the primary winding 3a of the transformer 3 in the opposite direction to that during the period T0–T1, and the primary voltage Vt quickly drops from 0 to −Vin. Furthermore, the primary current It of the transformer 3 flows through the primary winding 3a from the second junction point Q to the first junction point P, i.e. in the opposite direction to that during the period T0–T1. Therefore, the induced voltage across each of the secondary windings 3b and 3c of the transformer 3 quickly drops from zero to −Vin/n. Then, the voltage Vb across the first rectifying diode 4b is quickly raised to +2Vin/n, since the second rectifying diode 4c is already ON. Thereby, the first rectifying diode 4b is turned OFF. As a result, the secondary current of the transformer 3 begins to flow only through the second secondary winding 3c. Thus, at the time T4, commutation occurs on the secondary side of the transformer 3.

Furthermore, during the period T4–T5, in the similar manner to that during the period T0–T1, the voltage V5 across the smoothing inductor 5 is substantially equal to Vin/n−Vout. Accordingly, the output current I5 flowing through the smoothing inductor 5 increases linearly and slowly in the direction of the arrow shown in FIG. 1, in the similar manner to that during the period T0–T1. Then, the secondary current of the transformer 3 flows only through the second secondary winding 3c and increases linearly, since the first rectifying diode 4b is OFF. When the first rectifying diode 4b is OFF, the first snubber capacitor 8Cb stores charges in proportion to the reverse bias Vb=+2Vin/n across the first rectifying diode 4b.

As shown in FIG. 2, during the period T4–T5, the primary voltage Vt is maintained at the substantially steady value −Vin. Therefore, the exciting current in the primary current It linearly increases in substance. On the other hand, the equivalent primary current increases linearly, since the secondary current of the transformer 3 increases linearly as described above. Accordingly, the primary current It linearly increases in substance.

<Period T5–T7>

At the time T5, the switching control circuit 7 changes the third switching signal G3 from H to L, and thereby turning OFF the second high-side switching section 2H. On the other hand, the first low-side switching section 1L is maintained ON. Then, resonance occurs among the leak inductance of the primary winding 3a, the parasitic capacitor 2HC of the second high-side switching section 2H, and the parasitic capacitor 2LC of the second low-side switching section 2L. Because of the resonance, the primary current It simultaneously causes the parasitic capacitor 2HC of the second high-side switching section 2H to charge and the parasitic capacitor 2LC of the second low-side switching section 2L to discharge. Accordingly, the voltage V2H across the second high-side switching section 2H is smoothly raised from zero, and the voltage V2L across the second low-side switching section 2L drops smoothly from the maximum value Vin.

At the time T6, the voltage V2H across the second high-side switching section 2H reaches the maximum value Vin. At the same time, the voltage V2L across the second low-side switching section 2L reaches zero. Then, the diode 2LD of the second low-side switching section 2L is turned ON, thereby clamping the voltage V2L at zero. Thereby, the primary voltage Vt is smoothly raised in the similar manner and clamped at zero.

During the period T5–T6, the voltage across each of the first secondary winding 3b and the second secondary winding 3c is raised with the rising of the primary voltage Vt. Then, the voltage Vc across the second rectifying diode 4c is substantially zero, since the diode is ON. On the other hand, the voltage Vb across the first rectifying diode 4b drops. In other words, the reverse bias across the first rectifying diode 4b decreases. Then, the first snubber capacitor 8Cb discharges. Based on the discharge current, resonance occurs between the first snubber capacitor 8Cb and the leak inductance on the secondary side of the transformer 3. Here, the leak inductance on the secondary side, which is similar to that in the period from T1–T3, is substantially equal to the leak inductance on the secondary side of the transformer 3 with the primary winding short-circuited. Furthermore, the capacitance of the first snubber capacitor 8Cb is substantially equal to that of the second snubber capacitor 8Cc and is sufficiently larger than the parasitic capacitor in the switching section. Accordingly, the resonance cycle between the first snubber capacitor 8Cb and the above-described leak inductance on the secondary side is sufficiently longer than the resonance cycle between the parasitic capacitor in the switching section and the primary winding 3a. As a result, the voltage Vb across the first rectifying diode 4b drops more slowly than the rising of the primary voltage Vt after the time T5, and reaches zero immediately before the time T7 that is after the time T6. Then, the first rectifying diode 4b is turned ON.

The first snubber capacitor 8Cb discharges by the resonance during the period T5–T7. The discharge current quickly and smoothly increases the first secondary current Ib flowing through the first secondary winding 3b. Thereby, the second secondary current Ic flowing through the second secondary winding 3c decreases quickly and smoothly. As a result, the difference between the secondary currents Ib and Ic respectively flowing through the secondary windings 3b and 3c is almost negligible nearly at the time T7. Thus, cancellation occurs speedily between the secondary currents of the secondary windings 3b and 3c during the period T5–T7, and reduces quickly and smoothly the equivalent primary current to zero in substance. Therefore, the primary current It decreases quickly and smoothly from the value at the time T5.

<Period T7–T8>

At the time T7, the switching control circuit 7 changes the second switching signal G2 from H to L, thereby turning OFF the first low-side switching section 1L. Thus, all the four switching sections are OFF. Then, the voltages V1L and V2L across the two low-side switching sections 1L and 2L, respectively, are both zero. Accordingly, the voltages V1H and V2H across the two high-side switching sections 1H and 2H, respectively, are both equal to the input voltage Vin. After the time T7, the voltages across the high-side switching sections drop from Vin with ringing, and the voltages across the low-side switching sections are raised from zero with ringing.

During the period T7–T8, the primary voltage Vt of the transformer 3 is maintained at substantially zero. Accordingly, the induced voltage across each of the two secondary windings 3b and 3c of the transformer 3 is similarly maintained at zero. Furthermore, the first rectifying diode 4b and the and second rectifying diode 4c are both ON. Therefore, the voltage V5 across the smoothing inductor 5 is maintained at the negative steady voltage −Vout. As a result, the output current I5 flowing through the smoothing inductor 5 decreases smoothly and linearly with a slight inclination.

Once the primary current It of the transformer 3 decreases quickly during the period from T5–T7, the primary current is further speedily reduced to zero at the time T7. Accordingly, the decrease is gentle in contrast to the conventional hard switching, and noises such as undershoots are therefore reduced.

After the time T7, the primary current It does not flow substantially. Accordingly, the secondary current of the transformer 3 continuously flows through each of the two secondary windings 3b and 3c, wherein one part of the secondary current flowing through the first secondary winding 3b is substantially equal in amount and opposite in direction to the other part flowing through the second secondary winding 3c, so that the equivalent primary current is zero. In other words, the first secondary current Ib is substantially equal to the second secondary current Ic during the period T7–T8.

Thus, the state immediately before the time T0 reoccurs in the period T7–T8. After that, the operations during the period T0–T8 are repeated in cycle.

In the switching by the switching control circuit 7, the transfer factor, i.e. the ratio of the input voltage Vin to the output voltage Vout, is obtained as follows:

Let Ton to be the sum of the time lengths of the first period T0–T1 during when the first high-side switching section 1H is ON and the second period T4–T5 during when the second high-side switching section 2H is ON. Since the voltage (Vin/n–Vout) is applied across the smoothing inductor 5 during the first and second periods, the magnetic flux to be stored in the smoothing inductor 5 increases by (Vin/n–Vout)×Ton in total.

Let Toff to be the sum of the time lengths of the two third periods, i.e. the period T3–T4 and the period T7–T8, during when all the switching sections are OFF. Since the voltage (–Vout) is applied across the smoothing inductor 5 during each of the period, the magnetic flux to be stored in the smoothing inductor 5 decreases by Vout×Toff in total. Here, the time lengths of the two fourth periods, i.e. the period T1–T3 and the period T5–T7, during when the above-described resonance occurs, namely the delay times, are sufficiently shorter than each time length of the first, the second, and the third periods. Hence, the fourth periods are ignored in the following description of the transfer factor.

The reset condition of the smoothing inductor 5 within the period T0–T8, i.e. the condition in balance between the increment and decrement of the magnetic flux in the smoothing inductor 5, is represented by the following equation (1).

$$(Vin/n-Vout) \times Ton = Vout \times Toff \quad (1)$$

The transfer factor, the ratio between the input voltage Vin and the output voltage Vout, is obtained from the equation (1) as the following equation (2).

$$Vout/Vin = \delta/n,$$

where $$\delta = Ton/(Ton+Toff) \quad (2)$$

As the equation (2) indicates, the control over the duty factor δ for the ON/OFF times of the high-side switching sections stably maintains the output voltage Vout at a substantially steady value.

The switching control circuit 7 achieves, after each of the first period and the second period, the fourth period and the third period in the order named. Once the primary current It of the transformer 3 decreases quickly and smoothly during the fourth period, the primary current decreases to zero more quickly at the start of the third period. Thus, the change of the primary current It is gentle when each of the four switching sections is turned OFF, in contrast to the conventional hard switching. Therefore, the switching loss caused by the cut-off of the primary current It is reduced in comparison with the conventional hard switching.

Preferably, the delay time, i.e. the time length of the fourth period, is substantially equal to ¼ of the resonance cycle depending on the equivalent capacitance of the snubber and the leak inductance on the secondary side of the transformer 3 with the primary winding 3a short-circuited. For example, as indicated by the dot-dash line A in FIG. 2, the delay time, i.e. the time during when the fourth switching signal G4 is H, is extended. Thereby, as indicated by the dot-dash line B in FIG. 2, the primary current It of the transformer 3 decreases continuously, exceeding the end time T3 of the resonance between the second snubber capacitor 8Cc and the leak inductance on the secondary side of the transformer 3. However, the decrease of the primary current It within the third period T3–T4 is rather slower than that during the fourth period T1–T3. Accordingly, the primary current It is almost steady after the time T3. Therefore, the switching loss caused by the cut-off of the primary current It is almost constant when the delay time is extended. On the other hand, the extension of the delay time causes the extension of the conduction time for the primary current It, thereby increasing the circulating current loss. On balance, the delay time is adjusted to be substantially equal to, or at most several times as long as, ¼ times the resonance cycle between the second snubber capacitor 8Cc and the leak inductance on the secondary side of the transformer 3, i.e. the time length of the period from the start of the resonance to the turning-ON of the second rectifying diode 4c. Thereby, the circulating current loss is effectively reduced without substantial change of the switching loss caused by the cut-off of the primary current It. Thus, the efficiency of the switching power supply 10 according to Example 1 is high.

EXAMPLE 2

A switching power supply according to Example 2 of the present invention has the similar configuration to the switching power supply 10 according to Example 1, in particular, a full-bridge type converter. However, in contrast to Example 1, the switching control circuit 7 performs a soft switching for the four switching sections 1H, 1L, 2H, and 2L.

FIG. 1 is cited with respect to the circuit configuration of the switching power supply according to Example 2, since the circuit configuration is similar to that of the switching power supply 10 according to Example 1 shown in FIG. 1.

In the switching control according to Example 1, at the starts of the first period and the second period, such as the times T0 and T4 in FIG. 2, the high-side switching section and the low-side switching section are simultaneously turned ON. Then, the switching loss increases as follows: Each of the switching sections in the full-bridge includes the parasitic capacitor connected in parallel with its switching device as shown in FIG. 1. When all the switching sections are OFF, each of the parasitic capacitors is stable in a charged state. Accordingly, at the time when each of the switching sections turns ON, the switching device in parallel with the parasitic capacitor charged to some extent is turned ON. Then, the parasitic capacitor is short-circuited via the switching device in ON, and discharges abruptly. Thereby, a surge current occurs in the switching section and is converted into heat or an electromagnetic wave. Electric power is dissipated via the heat or the electromagnetic wave. Thus, the switching loss increases.

For example, immediately before the time T0 in FIG. 2, the voltage V1H across the first high-side switching section 1H and the voltage V2L across the second low-side switching section 2L are each maintained at finite values. Accordingly, the parasitic capacitor 1HC of the first high-side switching section 1H and the parasitic capacitor 2LC of the second low-side switching section 2L store charges in proportion to the voltages V1H and V2L, respectively. When both the switching sections are turned ON at the time T0, both the parasitic capacitors 1HC and 2LC discharge abruptly, and surge currents occur. Thereby, the current I1H flowing through the first high-side switching section 1H and the current I2L flowing through the second low-side switching section 2L increase so as to reach steep peaks sc. At the time T4, the current I1L flowing through the first low-side switching section 1L and the current I2H flowing through the second high-side switching section 2H increase so as to reach similar peaks, when the first low-side switching section 1L and the second high-side switching section 2H are simultaneously turned ON.

Furthermore, in the switching according to Example 1, the voltages across the high-side and the low-side switching sections each change with ringing. The surge voltages causing the ringing increase the switching loss.

In FIG. 2, for example, when the second low-side switching section 2L is turned OFF at the time T3, the voltage V1L across the first low-side switching section 1L and the voltage V2L across the second low-side switching section 2L are each raised from zero with ringing. Thereby, the voltages change so as to form the steep peaks sv1 and sv2 as shown in FIG. 2. Similar peaks also appear on the voltage V1L across the low-side switching section 1L and the voltage V2H across the low-side switching section 2L when the first low-side switching section 1L is turned OFF at the time T7. Accordingly, the switching loss increases.

The switching power supply according to Example 2 achieves a soft switching, in particular ZVS, for the turning-ON of the low-side switching sections as described later. Thereby, the switching power supply suppresses the occurrence of the above-described surge currents/voltages, and further reduces the switching loss.

Figure 3:
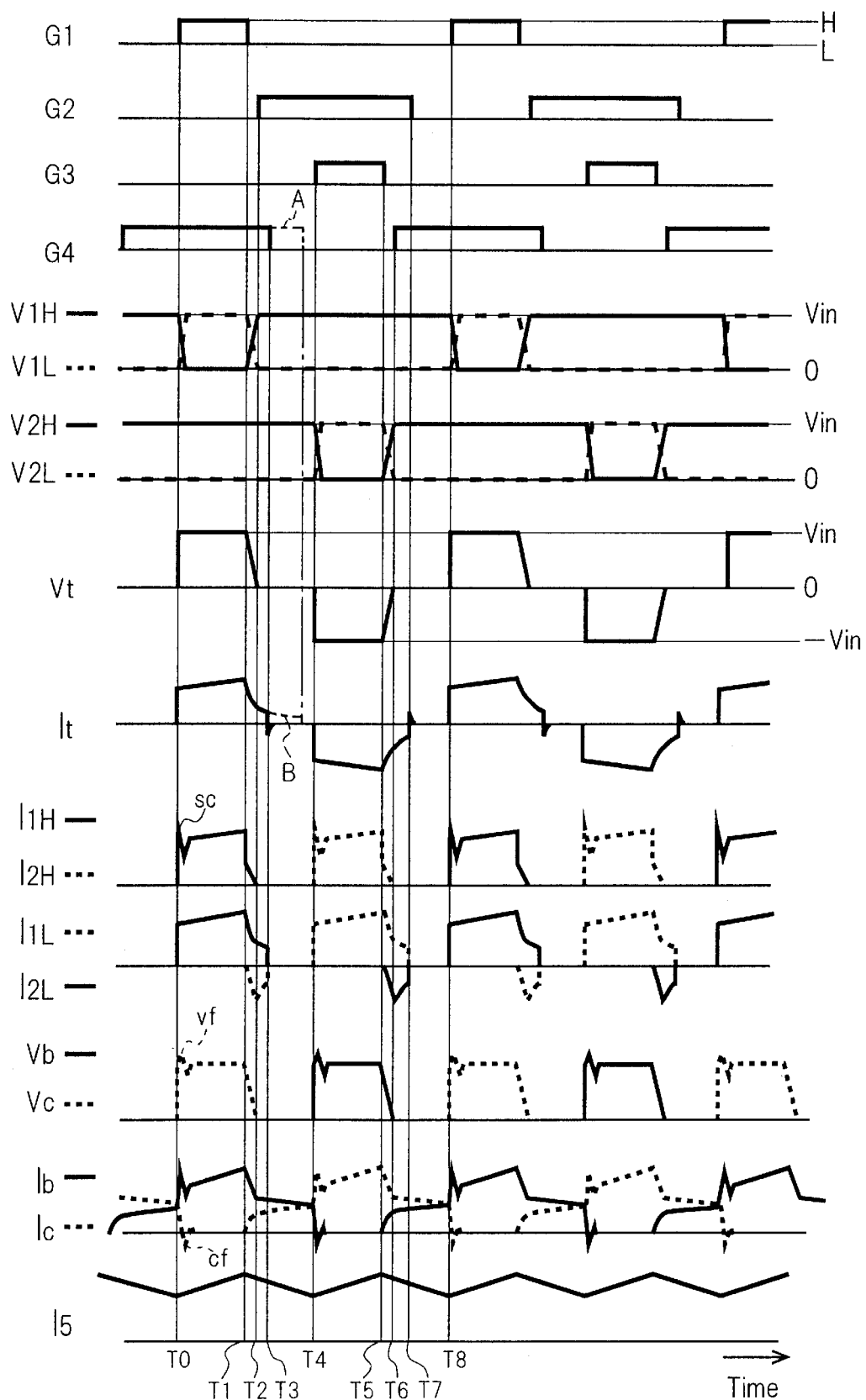
FIG. 3 is a diagram showing the waveforms of the currents and voltages occurring at. various sections of the circuit shown in FIG. 1 by the switching of a switching power supply according to Example 2.

FIG. 3 is a diagram showing the waveforms of the currents and voltages occurring at various sections of the circuit shown in FIG. 1, by the switching of the switching control circuit 7 according to Example 2. Here, the currents and voltages shown in FIG. 3 are similar to those shown in FIG. 2, and the directions of the arrows shown in FIG. 1 are assumed to be positive.

The switching in Example 2 sequentially achieves the following five periods with predetermined time lengths and predetermined cycle periods: (1) A first period corresponds to the period T0–T1 in FIG. 3. During the first period, the first high-side switching section 1H and the second low-side switching section 2L are ON, and the second high-side switching section 2H and the first low-side switching section 1L are OFF. (2) A second period corresponds to the period T4–T5 in FIG. 3. During the second period, the first high-side switching section 1H and the second low-side switching section 2L are OFF, and the second high-side switching section 2H and the first low-side switching section 1L are ON. (3) A third period corresponds to each of the period T3–T4 and the period T7–T8 in FIG. 3, being achieved between the first period and the second period. During the third period, either of the first low-side switching section 1L and the second low-side switching section 2L is ON, and the other three of the switching sections are OFF. (4) A dead time is an infinitesimal period achieved at each end of the first period and the second period, and corresponds to each of the period T1–T2 and the period T5–T6. During the dead time, either the pair of the first high-side switching section 1H and the first low-side switching section 1L, or the pair of the second high-side switching section 2H and the second low-side switching section 2L are OFF. (5) A fourth period is achieved at each end of the first period and the second period, overlapping with the above-described dead time, and corresponds to each of the period T1–T3 and the period T5–T7 in FIG. 3. During the fourth periods, resonance occurs between the snubber capacitor in the rectifying section and the leak inductance on the secondary side of the transformer 3, in the similar manner to that of Example 1. The time length of the fourth period is referred to as a delay time, similarly to Example 1. The delay time is sufficiently longer than the dead time.

The following is the description of the switching in Example 2 in the sequence from the time T0 to the time T8 shown in FIG. 3.

<Period T0–T1>

During the period T0–T1, both of the primary current It and the current I5 following through the smoothing inductor 5 increase linearly, in the similar manner to that during the period T0–T1 in Example 1 (cf. FIG. 2). Then, the first rectifying diode 4b is ON, and the second rectifying diode 4c is OFF. Accordingly, the secondary current of the transformer 3 flows only through the first secondary winding 3b. Furthermore, the second snubber capacitor 8Cc stores charges in proportion to the reverse bias Vc across the second rectifying diode 4c.

<Period T1–T2>

At the time T1, the switching control circuit 7 changes the first switching signal G1 from H to L, thereby turning OFF the first high-side switching section 1H. On the other hand, the second low-side switching section 2L is maintained ON. Then, resonance occurs among the leak inductance of the primary winding 3a, the parasitic capacitor 1HC of the first high-side switching section 1H, and the parasitic capacitor 1LC of the first low-side switching section 1L. Because of the resonance, the primary current It simultaneously causes the parasitic capacitor 1HC of the first high-side switching section 1H to charge and the parasitic capacitor 1LC of the first low-side switching section 1L to discharge. Accordingly, the voltage V1H across the first high-side switching section 1H is smoothly raised from zero, and the voltage V1L across the first low-side switching section 1L drops smoothly from the maximum value Vin.

Immediately before the time T2, the voltage V1H across the first high-side switching section 1H reaches the maximum value Vin. At the same time, the voltage V1L across the first low-side switching section 1L reaches zero. Then, the diode ILD of the first low-side switching section 1L is turned ON, thereby clamping the voltage V1L at zero. At the time T2, the switching control circuit 7 changes the second switching signal G2 from L to H, thereby turning ON the first low-side switching section 1L. As a result, ZVS is achieved for the turning-ON of the first low-side switching section 1L.

On the other hand, the voltage V2L across the second low-side switching section 2L is maintained at zero during the period T1–T2. Accordingly, the primary voltage Vt smoothly drops in the similar manner to that of the voltage V1L across the first low-side switching section 1L, and is clamped at zero.

<Period T1–T3>

During the period T1–T2, the voltage across each of the first secondary winding 3b and the second secondary winding 3c drop as the primary voltage Vt drops. Then, the voltage Vb across the first rectifying diode 4b is substantially zero, since the diode is ON. On the other hand, the voltage Vc across the second rectifying diode 4c drops. In other words, the reverse bias across the second rectifying diode 4c decreases. Thereby, the second snubber capacitor 8Cc discharges. Based on the discharge current, resonance occurs between the second snubber capacitor 8Cc and the leak inductance on the secondary side of the transformer 3. Here, the leak inductance on the secondary side is substantially equal to the leak inductance on the secondary side of the transformer 3 with the primary winding 3a short-circuited, similarly to Example 1. In addition, the capacitance of the second snubber capacitor 8Cc is sufficiently larger than the capacitances of the parasitic capacitors in the switching sections. Accordingly, the resonance cycle between the second snubber capacitor 8Cc and the above-described leak inductance on the secondary side is sufficiently longer than the resonance cycle between the parasitic capacitor in the switching section and the primary winding 3a. As a result, the voltage Vc across the second rectifying diode 4c drops more slowly than the primary voltage Vt after the time T1, and reaches zero immediately before the time T3 that is after the time T2. Then, the second rectifying diode 4c is turned ON.

The second snubber capacitor 8Cc discharges by the resonance during the period T1–T3. The discharge current quickly and smoothly increases the second secondary current Ic flowing through the second secondary winding 3c. Thereby, the first secondary current Ib flowing through the first secondary winding 3b decreases quickly and smoothly. As a result, the difference between the secondary current Ib flowing through the secondary winding 3b and the secondary current Ic flowing through the secondary winding 3c is almost negligible nearly at the time T3. Thus, cancellation occurs speedily between the secondary currents of the secondary windings 3b and 3c within the period T1–T3, thereby reducing the equivalent primary current to zero quickly and smoothly in substance. Therefore, the primary current It decreases quickly and smoothly from the value at the time T1.

<Period T3–T4>

At the time T3, the switching control circuit 7 changes the fourth switching signal G4 from H to L, thereby turning OFF the second low-side switching section 2L. Hence, only the first low-side switching section 1L is ON, and the other three of the switching sections are OFF. Thus, in Example 2, the first low-side switching section IL is already ON at the time T2 before the time T3, in contrast to Example 1. Accordingly, after the time T3 in Example 2, the ringing of the voltage V2L across the second low-side switching section 2L is more suppressed and attenuates more quickly than Example 1. As a result, the switching loss is reduced.

During the period T3–T4, the primary voltage Vt of the transformer 3 is maintained at zero. Accordingly, the induced voltages across each of the two secondary windings 3b and 3c of the transformer 3 are similarly maintained at zero. Furthermore, the first rectifying diode 4b and the second rectifying diode 4c are both ON. Therefore, the voltage V5 across the smoothing inductor 5 is stably maintained at the negative steady voltage −Vout. As a result, the output current I5 flowing through the smoothing inductor 5 decreases smoothly and linearly with a slight inclination.

Once the primary current It of the transformer 3 quickly decreases during the period T1–T3, the primary current decreases to zero more quickly at the time T3. Accordingly, the decrease is gentle in contrast to the conventional hard switching, and noises such as undershoots are therefore reduced.

After the time T3, the primary current It does not flow substantially. Accordingly, the secondary current of the transformer 3 continuously flows through each of the two secondary windings 3b and 3c, wherein one part of the secondary current flowing through the first secondary winding 3b is substantially equal in amount and opposite in direction to the other part flowing through the second secondary winding 3c, so that the equivalent primary current is zero. In other words, the first secondary current Ib is substantially equal to the second secondary current Ic during the period T3–T4.

<Period T4–T5>

At the time T4, the switching control circuit 7 changes the third switching signal G3 from L to H, thereby turning ON the second high-side switching section 2H. Then, the first high-side switching section 1H and the second low-side switching section 2L are both OFF, and the first low-side switching section 1L is ON. When the first low-side switching section 1L and the second high-side switching section 2H are ON, the input voltage Vin is applied across the primary winding 3a of the transformer 3 in the opposite direction to that during the period T0–T1, and the primary voltage Vt quickly drops to −Vin. Furthermore, the primary current It of the transformer 3 flows through the primary winding 3a from the second junction point Q to the first junction point P, i.e. in the opposite direction to that during the period T0–T1. Therefore, the induced voltage across each of the two secondary windings 3b and 3c of the transformer 3 quickly drops from zero to −Vin/n. Then, the voltage Vb across the first rectifying diode 4b is quickly raised to +2Vin/n since the second rectifying diode 4c is already ON. Thereby, the first rectifying diode 4b is turned OFF. As a result, the secondary current of the transformer 3 begins to flow only through the second secondary winding 3c. Thus, at the time T4, commutation occurs on the secondary side of the transformer 3.

During the period T4–T5, the voltage V5 across the smoothing inductor 5 is substantially equal to Vin/n−Vout, in the similar manner to that during the period T0–T1. Accordingly, the output current I5 flowing through the smoothing inductor 5 increases linearly and slowly in the direction of the arrow shown in FIG. 1, in the similar manner to that during the period T0–T1. The secondary current of the transformer 3 flows only through the second secondary winding 3c and increases linearly, since the first rectifying diode 4b is OFF. The first snubber capacitor 8Cb stores charges in proportion to the reverse bias Vb=+2Vin/n when the first rectifying diode 4b is OFF.

As shown in FIG. 3, during the period T4–T5, the primary voltage Vt is maintained at the substantially steady value −Vin. Hence, the exciting current in the primary current It linearly increases in substance. On the other hand, the equivalent primary current increases linearly, since the secondary current of the transformer 3 increases linearly as described above. Accordingly, the primary current It linearly increases in substance.

<Period T5–T6>

At the time T5, the switching control circuit 7 changes the third switching signal G3 from H to L, thereby turning OFF the second high-side switching section 2H. On the other hand, the first low-side switching section 1L is maintained ON. Then, resonance occurs among the leak inductance of the primary winding 3a, the parasitic capacitor 2HC of the second high-side switching section 2H, and the parasitic capacitor 2LC of the second low-side switching section 2L. Because of the resonance, the primary current It simultaneously causes the parasitic capacitor 2HC of the second high-side switching section 2H to charge and the parasitic capacitor 2LC of the second low-side switching section 2L to discharge. Accordingly, the voltage V2H across the second high-side switching section 2H is smoothly raised from zero, and the voltage V2L across the second low-side switching section 2L drops smoothly from the maximum value Vin.

Immediately before the time T6, the voltage V2H across the second high-side switching section 2H reaches the maximum value Vin. At the same time, the voltage V2L across the second low-side switching section 2L reaches zero. Then, the diode 2LD of the second low-side switching section 2L is turned ON, thereby clamping the voltage V2L at zero. At the time T6, the switching control circuit 7 changes the fourth switching signal G4 from L to H, thereby turning ON the second low-side switching section 2L. Thus, ZVS is achieved for the turning-ON of the second low-side switching section 2L.

The voltage V1L across the first low-side switching section 1L is maintained at zero during the period T5–T7. Accordingly, the primary voltage Vt increases smoothly, in the similar manner to that of the voltage V2L across the second low-side switching section 2L, and is clamped at zero.

<Period T5–T7>

During the period T5–T6, the voltage across each of the first secondary winding 3b and the second secondary winding 3c is raised as the primary voltage Vt is raised. Then, the voltage Vc across the second rectifying diode 4c is substantially zero, since the diode is ON. On the other hand, the voltage Vb across the first rectifying diode 4b drops. In other words, the reverse bias across the first rectifying diode 4b decreases. Thereby, the first snubber capacitor 8Cb discharges. Based on the discharge current, resonance occurs between the first snubber capacitor 8Cb and the leak inductance on the secondary side of the transformer 3. Here, the leak inductance on the secondary side is substantially equal to the leak inductance on the secondary side of the transformer 3 with the primary winding 3a short-circuited, similarly to during the period T1–T3. The capacitance of the first snubber capacitor 8Cb is sufficiently larger than the parasitic capacitor in the switching section. Accordingly, the resonance cycle between the first snubber capacitor 8Cb and the above-described leak inductance on the secondary side is sufficiently longer than the resonance cycle between the parasitic capacitor in the switching section and the primary winding 3a. As a result, the voltage Vb across the first rectifying diode 4b drops more slowly than the rising of the primary voltage Vt after the time T5, and reaches zero immediately before the time T7 that is after the time T6. Then, the first rectifying diode 4b is turned ON.

The first snubber capacitor 8Cb discharges by the resonance during the period T5–T7. The discharge current quickly and smoothly increases the first secondary current Ib flowing through the first secondary winding 3b. Thereby, the second secondary current Ic flowing through the second secondary winding 3c decreases quickly and smoothly. As a result, the difference between the secondary current Ib flowing through the secondary winding 3b and the secondary current Ic flowing through the secondary winding 3c is almost negligible nearly at the time T7. Thus, cancellation occurs speedily between the secondary currents of the secondary windings 3b and 3c during the period T5–T7, and reduces quickly and smoothly the equivalent primary current to substantially zero. Therefore, the primary current It quickly and smoothly decreases from the value at the time T5.

<Period T7–T8>

At the time T7, the switching control circuit 7 changes the second switching signal G2 from H to L, thereby turning OFF the first low-side switching section 1L. Hence, only the second low-side switching section 2L is ON, and the other three of the switching sections are OFF. Thus, in Example 2, the second low-side switching section 2L is already ON at the time T6 before the time T7, in contrast to Example 1. Accordingly, in Example 2 after the time T7, the ringing of the voltage V2L across the second low-side switching section 2L is more suppressed and attenuates more quickly than Example 1. As a result, the switching loss is reduced.

During the period T7–T8, the primary voltage Vt of the transformer 3 is maintained at zero. Accordingly, the induced voltage across each of the two secondary windings 3b and 3c of the transformer 3 is similarly maintained at zero. Furthermore, the first rectifying diode 4b and the second rectifying diode 4c are both ON. Therefore, the voltage V5 across the smoothing inductor 5 is stably maintained at the negative steady voltage −Vout. As a result, the output current I5 flowing through the smoothing inductor 5 decreases smoothly and linearly with a slight inclination.

Once the primary current It of the transformer 3 decreases quickly during the period T5–T7, the primary current decreases to zero more quickly at the time T7. Accordingly, the decrease is gentle in contrast to the conventional hard switching, and noises such as undershoots are therefore reduced.

After the time T7, the primary current It does not flow substantially. Accordingly, the secondary current of the transformer 3 continuously flows through each of the two secondary windings 3b and 3c, wherein one part of the secondary current flowing through the first secondary winding 3b is substantially equal in amount and opposite in direction to the other part flowing through the second secondary winding 3c, so that the equivalent primary current is zero. In other words, the first secondary current Ib is substantially equal to the second secondary current Ic during the period T7–T8.

Thus, the state immediately before the time T0 reoccurs in the period T7–T8. After that, the operations during the period T0–T8 are repeated in cycle.

In the switching according to Example 2, the transfer factor (the ratio between the input voltage Vin and the output voltage Vout) is, in the similar manner to that of Example 1, obtained as follows: Each time length of the two fourth periods, i.e. the period T1–T3 and the period T5–T7, during when the resonance occurs on the secondary side of the transformer 3, namely the delay time, is sufficiently shorter than each time length of the first, the second, and the third periods. Accordingly, the fourth periods are ignored in comparison with the first, the second, and the third periods, in the similar manner to that of Example 1. Within the first period T0–T1 and the second period T4–T5, the magnetic flux to be stored in the smoothing inductor 5 increases by (Vin/n−Vout)×Ton in total. Here, Ton is defined as the sum of the time lengths of the first period T0–T1 and the second period T4–T5. On the other hand, within the third periods, i.e. the period T3–T4 and the period T7–T8, the magnetic flux to be stored in the smoothing inductor 5 decreases by Vout×Toff in total. Here, Toff is assumed to be the time lengths of the third periods. Accordingly, within the period T0–T8, the reset condition of the smoothing inductor 5 is represented by the following equation (1), in the similar manner to that of Example 1:

$$(Vin/n-Vout) \times Ton = Vout \times Toff \quad (1)$$

The transfer factor is obtained from the equation (1) as the following equation (2), in the similar manner to that of Example 1.

$$Vout/Vin = \delta/n,$$

where $$\delta = Ton/(Ton+Toff) \quad (2)$$

As the equation (2) indicates, the control over the duty factor δ for the ON/OFF times of the high-side switching sections stably maintains the output voltage Vout at a substantially steady value.

The switching control circuit 7 achieves, after each of the first period and the second period, the fourth period and the third period in the order named. Once the primary current It of the transformer 3 decreases quickly and smoothly during the fourth period, the primary current decreases to zero more quickly at the start of the third period. Thus, the change of the primary current It at the time of the cut-off is gentler than that in the conventional hard switching. Therefore, the switching loss caused by the cut-off of the primary current It is more reduced than that of the conventional hard switching.

Furthermore, in Example 2, the ringing of the voltage across one of the low-side switching sections is suppressed by the turning-ON of the other of the low-side switching sections, and attenuates quickly, in contrast to Example 1. Therefore, no substantial surge voltage occur. Thus, the switching power supply according to Example 2 further reduces the switching loss at the starts of the third periods.

Preferably, the delay time, i.e. the time length of the fourth period is, similarly to that of Example 1, substantially equal to ¼ times the resonance cycle depending on the equivalent capacitance of the snubber and the leak inductance on the secondary side of the transformer 3 with the primary winding 3a short-circuited. For example, as indicated by the dot-dash line A in FIG. 3, the delay time, i.e. the time length of the period during when the fourth switching signal G4 is H, is extended. Thereby, as indicated by the dot-dash line B in FIG. 3, the primary current It of the transformer 3 decreases continuously, exceeding the end time T3 of the resonance between the second snubber capacitor 8Cc and the leak inductance on the secondary side of the transformer 3. However, after the time T3, the decrease in the primary current It within the third period T3–T4 is rather slower than that during the fourth period from T1–T3. Accordingly, the primary current It is almost steady after the time T3. Therefore, the switching loss caused by the cut-off of the primary current It is almost steady when the delay time is extended. On the other hand, the extension of the delay time causes the extension of the conduction time of the primary current It, thereby increasing the circulating current loss. On balance, the delay time is adjusted to be substantially equal to, or at most several times as long as, ¼ times the resonance cycle between the second snubber capacitor 8Cc and the leak inductance on the secondary side of the transformer 3, i.e. the time length of the period from the start of the resonance to the turning-ON of the second rectifying diode 4c. Thereby, the circulating current loss is effectively reduced without substantial change of the switching loss caused by the cut-off of the primary current It. Thus, the efficiency of the switching power supply according to Example 2 is high.

In Example 2, the two low-side switching sections 1L and 2L are ON during both the period T2–T3 and the period T6–T7. Thereby, the primary current It of the transformer 3 circulates only through the closed circuit comprising the primary winding 3a and the two low-side switching sections 1L and 2L. Alternatively, the two high-side switching sections 1H and 2H may be ON during one or both of the above-described periods, so that the primary current It circulates through the closed circuit comprising the primary winding 3a and the two high-side switching sections 1H and 2H. In particular, the primary current may circulate through the closed circuit on the side of the low-side switching sections during the period T2–T3, and through the closed circuit on the side of the high-side switching sections during the period T6–T7, alternately. Then, the circulation of the primary current It causes stresses to exert uniformly on the full-bridge circuit comprising the four switching sections. Thereby, stress concentration on some of the switching sections is avoided.

EXAMPLE 3

Figure 4:
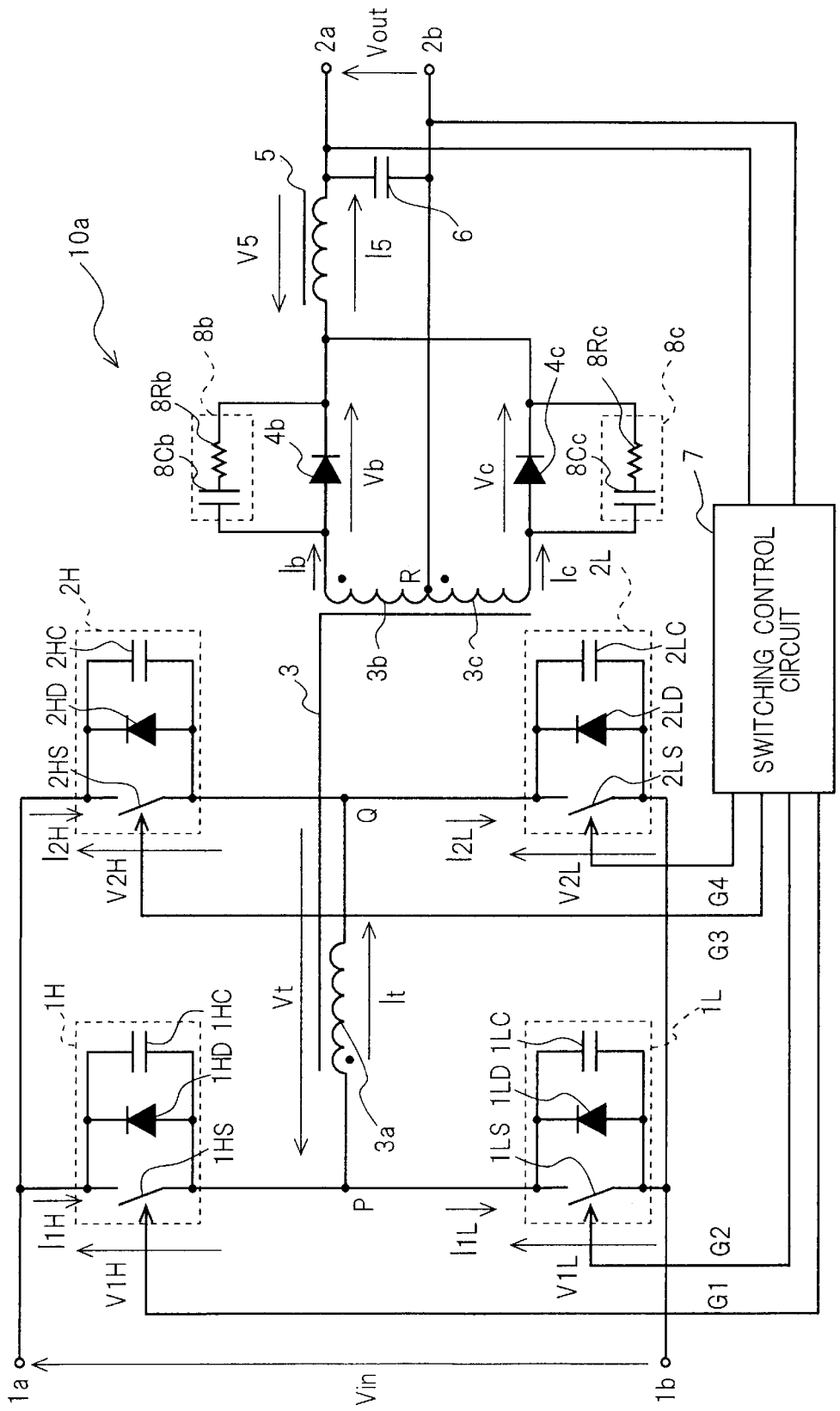
FIG. 4 is a circuit diagram of a switching power supply 10a according to Example 3 of the present invention.

FIG. 4 is a circuit diagram of a switching power supply 10a according to Example 3 of the present invention. The switching power supply 10a according to Example 3 comprises the different configurations of the snubbers 8b and 8c from that of the switching power supply 10 according to Example 1 shown in FIG. 1. Except for the configurations of the snubbers, the switching power supply 10a has the similar configuration to that of Example 1. Hence, the same reference signs as those in FIG. 1 designate the similar components, and the description in Example 1 is cited as that of the similar components.

The first snubber 8b includes a first snubber resistor 8Rb connected in series with the first snubber capacitor 8Cb, and the second snubber 8c includes a second snubber resistor 8Rc connected in series with the second snubber capacitor 8Cc. In other words, the rectifying sections include the RC snubbers in parallel with the respective rectifying diodes 4b and 4c.

In the above-described Examples 1 and 2, the turning-OFF of each of the rectifying diodes 4b and 4c causes a surge current/voltage within the commutation period on the secondary side. Thereby, as shown in FIG. 2 and FIG. 3, the secondary currents Ib and Ic flowing through the respective secondary windings 3b and 3c of the transformer 3 form the peaks cf, and the voltages Vb and Vc across the respective rectifying diodes 4b and 4c form the peaks vf.

In Example 3, the surge currents/voltages are reduced with the snubber resistor 8Rb in the snubber 8b and the snubber resistor 8Rc in the snubber 8c as follows: At the starts of the first period and the second period, one of the two rectifying diodes 4b and 4c is turned OFF. The starts of the first period and the second period correspond to the times T0 and T4 in FIGS. 2 and 3. The diode stores charges during ON. When the diode is turned OFF by abrupt application of a reverse bias, the diode discharges the stored charges as a reverse current. In the above-described snubbers 8b and 8c, at the starts of the first period and the second period, the snubber capacitors 8Cb and 8Cc discharge in the reverse directions for the respective rectifying diodes 4b and 4c.

Based on the discharge currents, the resonance occurs between the snubber capacitors 8C*b*/8C*c* and the leak inductances of the secondary windings 3*b*/3*c* of the transformer 3, respectively. The capacitances of the snubber capacitors 8C*b* and 8C*c* are sufficiently larger than the parasitic capacitances of the respective rectifying diodes 4*b* and 4*c* in the same rectifying sections. The above-described resonance cycles are therefore long. Furthermore, the peaks of the resonance currents are suppressed with the snubber resistors 8R*b* and 8R*c*. Accordingly, the surge currents/voltages caused by the above-described resonance are suppressed.

For example, when the reverse bias Vc is applied across the second rectifying diode 4*c* at the time T0, the resonance occurs between the second snubber capacitor 8C*c* and the leak inductance of the second secondary winding 3*c*. Thereby, the surge voltage occurs across the second rectifying section. As a result, as shown in FIG. 2 and FIG. 3, the peaks vf caused by the surge voltage appear on the voltage Vc across the second rectifying diode 4*c*, and the peaks cf caused by the surge current appears on the second secondary current Ic. In Example 3, the peaks vf and cf are suppressed with the second snubber resistor 8R*c*. Similarly, at the time T4, the peaks caused by the surge current/voltage are suppressed with the first snubber resistor 8R*b* in the first snubber 8*b*. Thus, Example 3 reduces the switching loss caused by the turning-OFF of the rectifying diodes.

EXAMPLE 4

Figure 5:
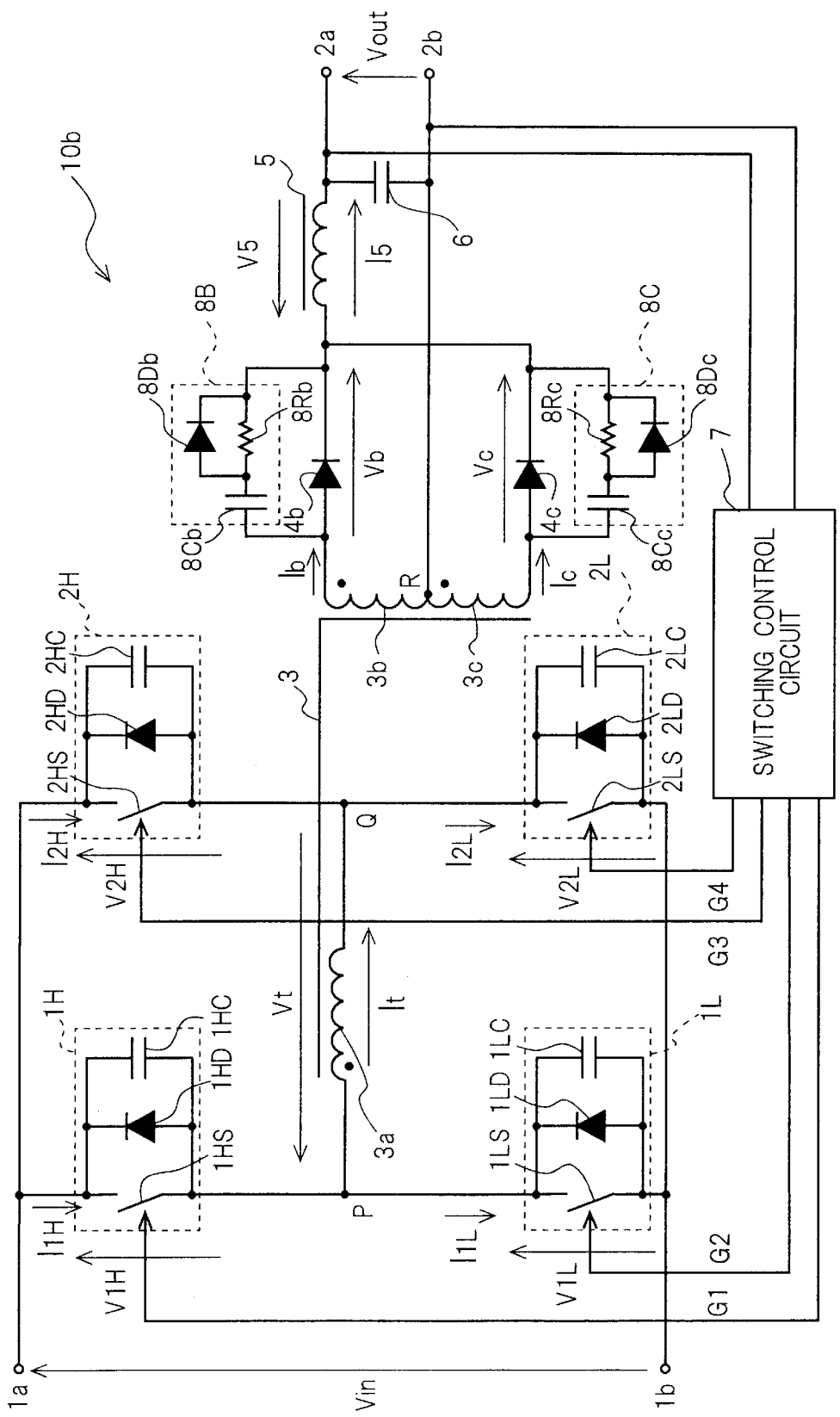
FIG. 5 is a circuit diagram of a switching power supply 10b according to Example 4 of the present invention.
Figure 6:
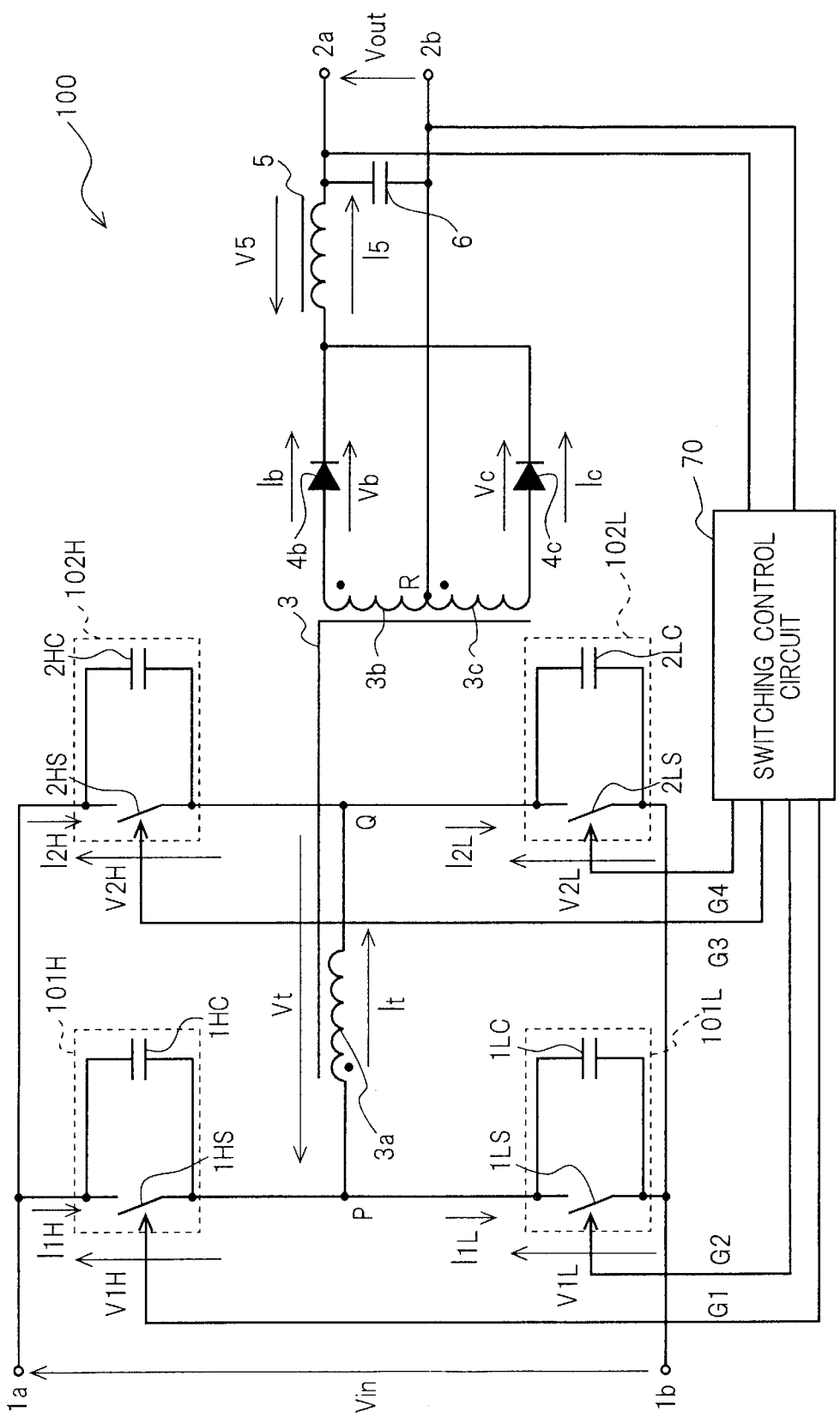
FIG. 6 is the circuit diagram of the switching power supply 100 according to the conventional hard switching.
Figure 7:
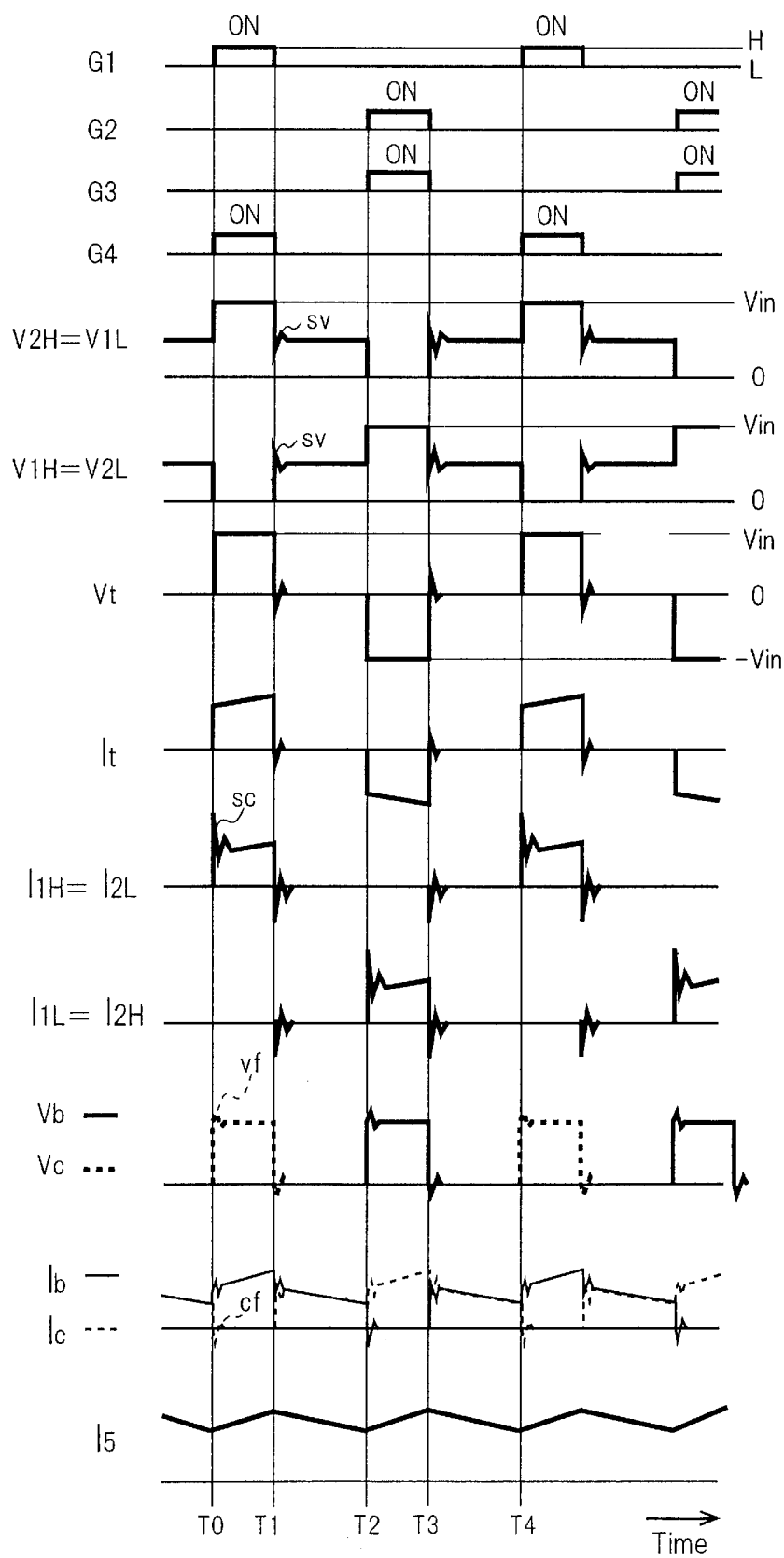
FIG. 7 is the diagram showing the waveforms of the currents and voltages occurring at various sections of the circuit shown in FIG. 6 by the hard switching of the conventional switching power supply 100.

FIG. 5 is a circuit diagram of a switching power supply 10*b* according to Example 4 of the present invention. The switching power supply 10*b* according to Example 4 comprises the different configurations of the snubbers 8B and 8C from that of the switching power supply 10*a* according to Example 3 shown in FIG. 4. Except for the configurations of the snubbers, the switching power supply 10*b* has the similar configuration to that of Example 3. Hence, the same reference signs as those in FIG. 4 designate the similar components, and the descriptions in Example 1 and Example 3 are cited as the descriptions of the similar components.

The first snubber 8B includes the first snubber resistor 8R*b* in series with the first snubber capacitor 8C*b*, and further includes a first auxiliary rectifying diode 8D*b* in parallel with the first snubber resistor 8R*b*. Similarly, the second snubber 8C includes the second snubber resistor 8R*c* in series with the second snubber capacitor 8C*c*, and further includes a second auxiliary rectifying diode 8D*c* in parallel with the second snubber resistor 8R*c*. In other words, the two rectifying sections include the RCD snubbers in parallel with the respective rectifying diodes 4*b* and 4*c*. Here, the auxiliary rectifying diodes 8D*b* and 8D*c* are respectively connected in the same directions as those of the corresponding rectifying diodes 4*b* and 4*c*.

In Example 4, the surge currents/voltages caused by the turning-OFF of the rectifying diodes 4*b* and 4*c* are reduced with the snubber resistors 8R*b* and 8R*c* in the snubbers 8*b* and 8*c*, within the commutation periods on the secondary side, in the similar manner to that of Example 3. Furthermore, in Example 4, the discharge currents from the snubber capacitors 8C*b* and 8C*c* flow through the respective auxiliary rectifying diodes 8D*b* and 8D*c* during the fourth periods, thereby bypassing the respective snubber resistors 8R*b* and 8R*c*, in contrast to Example 3. Hence, the reduction of the discharge currents caused by the snubber resistors 8R*b* and 8R*c* is avoided. Accordingly, the equivalent primary current is sufficiently cancelled during the fourth period.

Therefore, the primary current It of the transformer 3 is sufficiently reduced during the fourth period regardless of the snubber resistors 8R*b* and 8R*c*. Furthermore, the resistance values of the snubber resistors 8R*b* and 8R*c* may be sufficiently large, and therefore the surge currents/voltages are effectively reduced at the starts of the first period and the second period.

In the above-described Examples, the rectifying devices in the rectifying sections are diodes. Alternatively, the rectifying devices may be semiconductor-switching devices, such as IGBTs. Then, the switching control circuit controls the switching of the devices in synchronization with the switching of the switching sections constituting the full-bridge on the primary side.

As the above-described, the switching power supply according to the present invention includes the snubbers in parallel with the rectifying devices in the rectifying sections. In addition, when the primary current of the transformer is cut off, one of the high-side and the low-side switching sections that are ON is turned OFF the delay time later than the other. Thereby, the resonance occurs between the capacitance of the snubber and the leak inductance of the secondary side of the transformer. As a result, the equivalent primary current is quickly and sufficiently cancelled in the delay time, and therefore the primary current decreases quickly in the delay time. Thus, the primary current is sufficiently small at the time of the cutoff, and thereby the switching loss is small. Furthermore, the primary current is cut off while the current flowing through the smoothing inductor decreases, and therefore the circulating current loss is small. Accordingly, the efficiency of the switching power supply according to the present invention is high.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A switching power supply comprising:
    a DC-DC converter
        (A) including:
            (a) four switching sections of a first high-side switching section, a second high-side switching section, a first low-side switching section, and a second low-side switching section, each having (1) a switching device that is turned ON/OFF according to a switching signal from the outside, (2) a diode connected in parallel with said switching device, and (3) a capacitance connected in parallel with said switching device;
            (b) a transformer having (1) a primary winding, and (2) a first secondary winding and a second secondary winding connected in series whose junction point is a common terminal;
            (c) a first rectifying section and a second rectifying section, each having (1) a rectifying device and (2) a snubber connected in parallel with said rectifying device, said snubber having a snubber capacitor; and
            (d) a smoothing section having a first input terminal and a second input terminal, for smoothing an input supplied via said input terminals, and for outputting said smoothed input;

in said DC-DC converter,
- (B) the cathode of said first high-side switching section is connected with the higher potential terminal of a substantially steady direct voltage source, the anode of said first high-side switching section is connected with the cathode of said first low-side switching section, and the anode of said first low-side switching section is connected with the lower potential terminal of said substantially steady direct voltage source;
- (C) the cathode of said second high-side switching section is connected with said higher potential terminal of said substantially steady direct voltage source, the anode of said second high-side switching section is connected with the cathode of said second low-side switching section, and the anode of said second low-side switching section is connected with said lower potential terminal of said substantially steady direct voltage source;
- (D) one terminal of said primary winding of said transformer is connected with the junction point between said first high-side switching section and said first low-side switching section, and the other terminal of said primary winding is connected with the junction point between said second high-side switching section and said second low-side switching section;
- (E) a terminal other than said common terminal of said first secondary winding of said transformer is connected with the anode of said first rectifying section, a terminal other than said common terminal of said second secondary winding is connected with the anode of said second rectifying section, and said common terminal is connected with said first input terminal of said smoothing section; and
- (F) the cathode of each of said first rectifying section and the second rectifying sections are connected with said second input terminal of said smoothing section; and a switching control section for
- (A) determining a delay time based on a resonance cycle depending on the equivalent capacitance of said snubber in each of said first rectifying section and said second rectifying section, and the leak inductance on the secondary side of said transformer with said primary winding short-circuited; and
- (B) outputting said switching signal with a predetermined switching frequency and a predetermined phase to each of said four switching sections, thereby
  - (a) achieving a first period and a second period sequentially with predetermined time lengths and predetermined cycle periods, (1) during said first period, said first high-side switching section and said second low-side switching section are ON and said second high-side switching section and said first low-side switching section are OFF, and (2) during said second period, said first high-side switching section and said second low-side switching section are OFF and said second high-side switching section and said first low-side switching section are ON;
  - (b) at the end of said first period, turning OFF one of said first high-side switching section and said second low-side switching section said delay time later than the turning-OFF of the other switching section; and
  - (c) at the end of said second period, turning OFF one of said second high-side switching section and said first low-side switching section said delay time later than the turning-OFF of the other switching section.

2. A switching power supply according to claim 1, wherein said switching control section
- (a) at the end of said first period, turns OFF said second low-side switching section said delay time later than the turning-OFF of said first high-side switching section; and
- (b) at the end of said second period, turns OFF said first low-side switching section said delay time later than the turning-OFF of said second high-side switching section.

3. A switching power supply according to claim 1, wherein said switching control section
- (a) at the end of said first period, turns OFF said first high-side switching section said delay time later than the turning-OFF of said second low-side switching section; and
- (b) at the end of said second period, turns OFF said second high-side switching section said delay time later than the turning-OFF of said first low-side switching section.

4. A switching power supply according to claim 1, wherein said switching control section
- (a) at the end of said first period, turns OFF said second low-side switching section said delay time later than the turning-OFF of said first high-side switching section; and
- (b) at the end of said second period, turns OFF said second high-side switching section said delay time later than the turning-OFF of said first low-side switching section.

5. A switching power supply according to claim 1, wherein said switching control section
- (A) determines a first dead time based on a resonance cycle depending on the equivalent capacitance of said first high-side switching section, the equivalent capacitance of said first low-side switching section, and the leak inductance of said primary winding of said transformer;
- (B) determines a second dead time based on a resonance cycle depending on the equivalent capacitance of said second high-side switching section, the equivalent capacitance of said second low-side switching section, and the leak inductance of said primary winding of said transformer; and
- (C) at each end of said first period and said second period, achieves one of the periods
  - (a) when said first high-side switching section and said first low-side switching section are both OFF during said first dead time; and
  - (b) when said second high-side switching section and said second low-side switching section are both OFF during said second dead time.

6. A switching power supply according to claim 2, wherein said switching control section
- (A) determines a first dead time based on a resonance cycle depending on the equivalent capacitance of said first high-side switching section, the equivalent capacitance of said first low-side switching section, and the leak inductance of said primary winding of said transformer;
- (B) determines a second dead time based on a resonance cycle depending on the equivalent capacitance of said second high-side switching section, the equivalent capacitance of said second low-side switching section, and the leak inductance of said primary winding of said transformer;

(C) at the end of said first period, turns ON said first low-side switching section said first dead time later than the turning-OFF of said first high-side switching section; and (D) at the end of said second period, turns ON said second low-side switching section said second dead time later than the turning-OFF of said second high-side switching section.

7. A switching power supply according to claim 3, wherein said switching control section (A) determines a first dead time based on a resonance cycle depending on the equivalent capacitance of said first high-side switching section, the equivalent capacitance of said first low-side switching section, and the leak inductance of said primary winding of said transformer;

(B) determines a second dead time based on a resonance cycle depending on the equivalent capacitance of said second high-side switching section, the equivalent capacitance of said second low-side switching section, and the leak inductance of said primary winding of said transformer;

(C) at the end of said first period, turns ON said second high-side switching section said second dead time later than the turning-OFF of said second low-side switching section; and (D) at the end of said second period, turns ON said first high-side switching section said first dead time later than the turning-OFF of said first low-side switching section.

8. A switching power supply according to claim 4, wherein said switching control section (A) determines a first dead time based on a resonance cycle depending on the equivalent capacitance of said first high-side switching section, the equivalent capacitance of said first low-side switching section, and the leak inductance of said primary winding of said transformer;

(B) at the end of said first period, turns ON said first low-side switching section said first dead time later than the turning-OFF of said first high-side switching section; and (C) at the end of said second period, turns ON said first high-side switching section said first dead time later than the turning-OFF of said first low-side switching section.

9. A switching power supply according to claim 1, wherein said delay time is substantially ¼ of the resonance cycle depending on the equivalent capacitance of said snubber in each of said first rectifying section and the second rectifying section, and the leak inductance on the secondary side of said transformer with said primary winding short-circuited.

10. A switching power supply according to claim 1, wherein said snubber includes a resistor connected in series with said snubber capacitor.

11. A switching power supply according to claim 10, wherein (a) said snubber includes an auxiliary rectifying device connected in parallel with said resistor; and (b) one pair of the anodes and the cathodes of said rectifying device and said auxiliary rectifying device is connected with each other.

\* \* \* \* \*

UNITED STATES PATENT AND TRADEMARK OFFICE
CERTIFICATE OF CORRECTION

PATENT NO. : 6,483,723 B2 Page 1 of 1
DATED : November 19, 2002
INVENTOR(S) : Kuranuki et al.

It is certified that error appears in the above-identified patent and that said Letters Patent is hereby corrected as shown below:

Column 2,
Line 63, please replace "15" with -- I5 --.

Column 3,
Line 4, please replace "15" with -- I5 --.

Column 19,
Lines 19 and 21, please replace "ILC" with -- 1LC --.

Column 30,
Line 53, please replace "ILD" with -- 1LD --.

Signed and Sealed this

Seventh Day of October, 2003

JAMES E. ROGAN
*Director of the United States Patent and Trademark Office*